United States Patent [19]

Morishita

[11] Patent Number: 5,477,788
[45] Date of Patent: Dec. 26, 1995

[54] MAGNETIC LEVITATING APPARATUS

[75] Inventor: Mimpei Morishita, Tokyo, Japan

[73] Assignee: Kabushiki Kaisha Toshiba, Kawasaki, Japan

[21] Appl. No.: 162,980

[22] Filed: Dec. 7, 1993

[30] Foreign Application Priority Data

Dec. 7, 1992 [JP] Japan .................. 4-351167

[51] Int. Cl.$^6$ ................................. B60L 13/06
[52] U.S. Cl. ........................................ 104/284
[58] Field of Search .................... 104/281, 282, 104/284

[56] References Cited

U.S. PATENT DOCUMENTS

| | | | |
|---|---|---|---|
| 3,899,979 | 8/1975 | Godsey | 104/284 |
| 3,937,148 | 2/1976 | Simpson | 104/289 |
| 4,641,586 | 2/1987 | Miller et al. | 104/284 |
| 4,924,778 | 5/1990 | Morishita et al. | 104/284 |
| 4,967,670 | 11/1990 | Morishita et al. | 104/284 |
| 4,972,779 | 11/1990 | Morishita et al. | 104/284 |
| 5,156,093 | 10/1992 | Azukizawa et al. | 104/284 |

Primary Examiner—Robert J. Oberleitner
Assistant Examiner—S. Joseph Morano
Attorney, Agent, or Firm—Oblon, Spivak, McClelland, Maier & Neustadt

[57] ABSTRACT

A magnetic levitating apparatus comprises a guide rail, a levitated object, a plurality of magnetic support units, a plurality of gap-variable mechanisms, a sensor unit, and a controller. The controller performs zero power levitation force control and specific control. The zero power levitation force control is effected to reduce to zero an excitation current to the electromagnet of at least one of the magnetic support units thereby to stabilize the magnetic levitation state of the levitated object on the basis of an output from the sensor unit. The specific control is effected to control an excitation current to the electromagnet of at least one of the magnetic support units thereby to have the zero power levitation force control effected irrespective of the magnitude of a spring constant of the elastic member, on the basis of the output of the sensor unit.

25 Claims, 20 Drawing Sheets

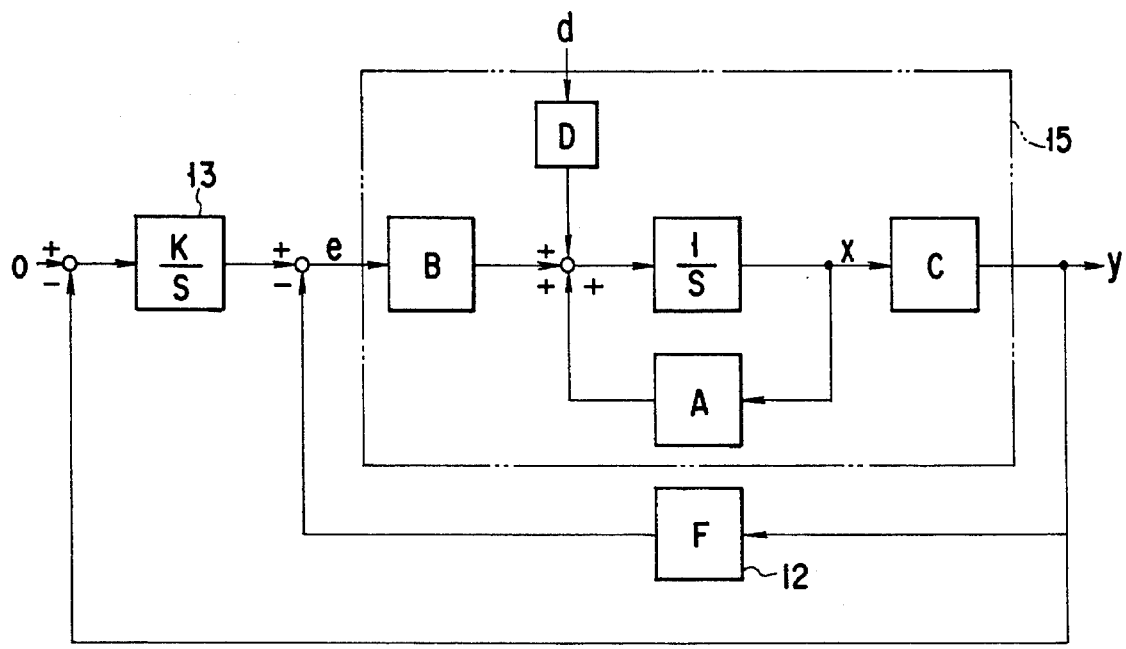
F I G. 7
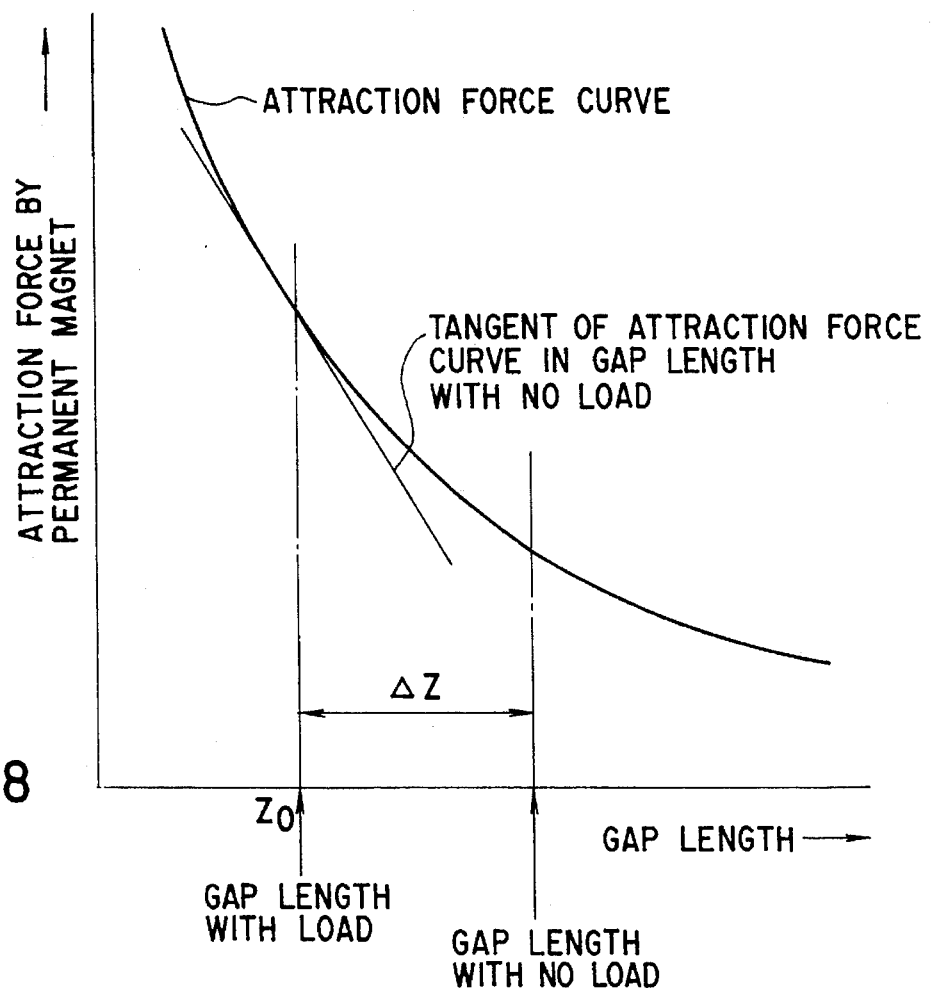
F I G. 8

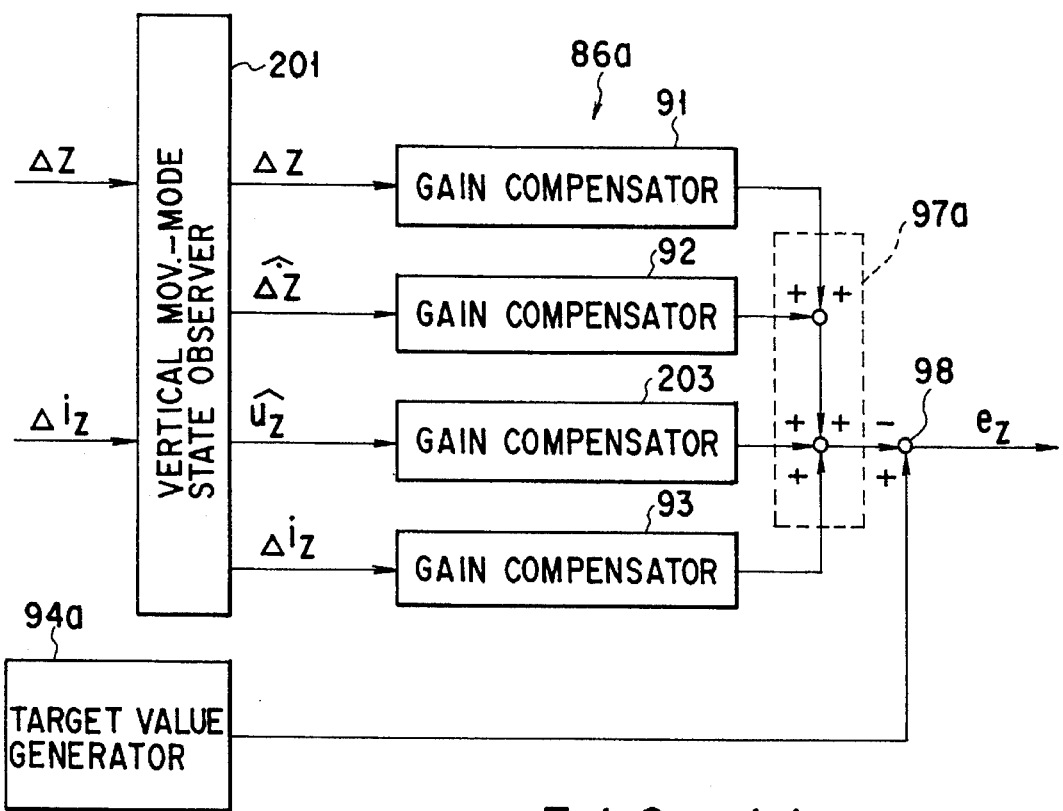
F I G. 11
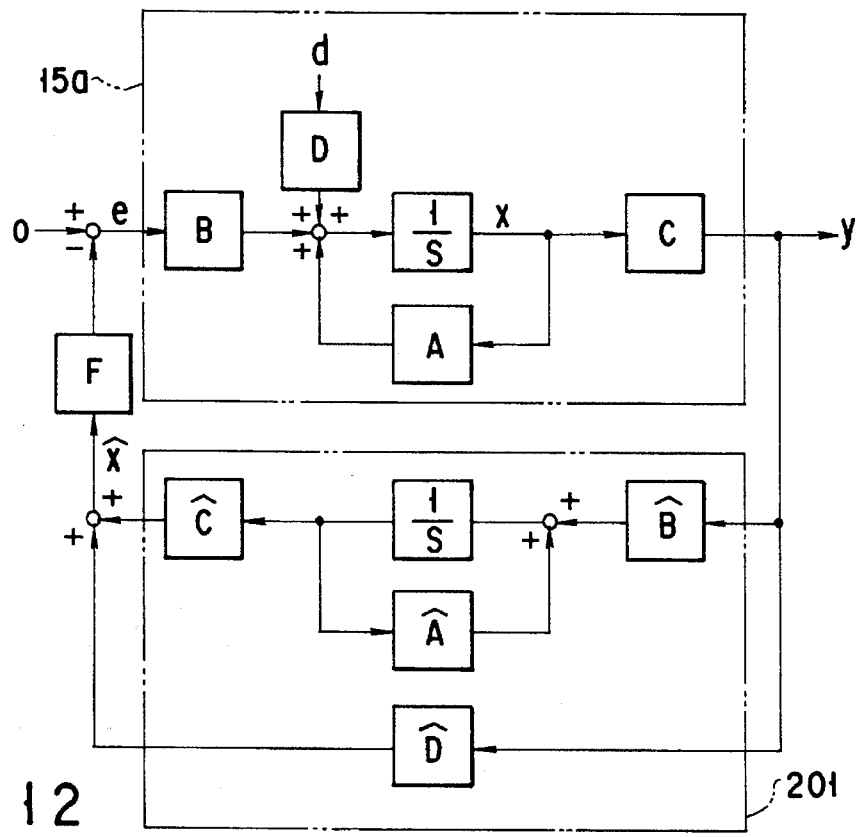
F I G. 12

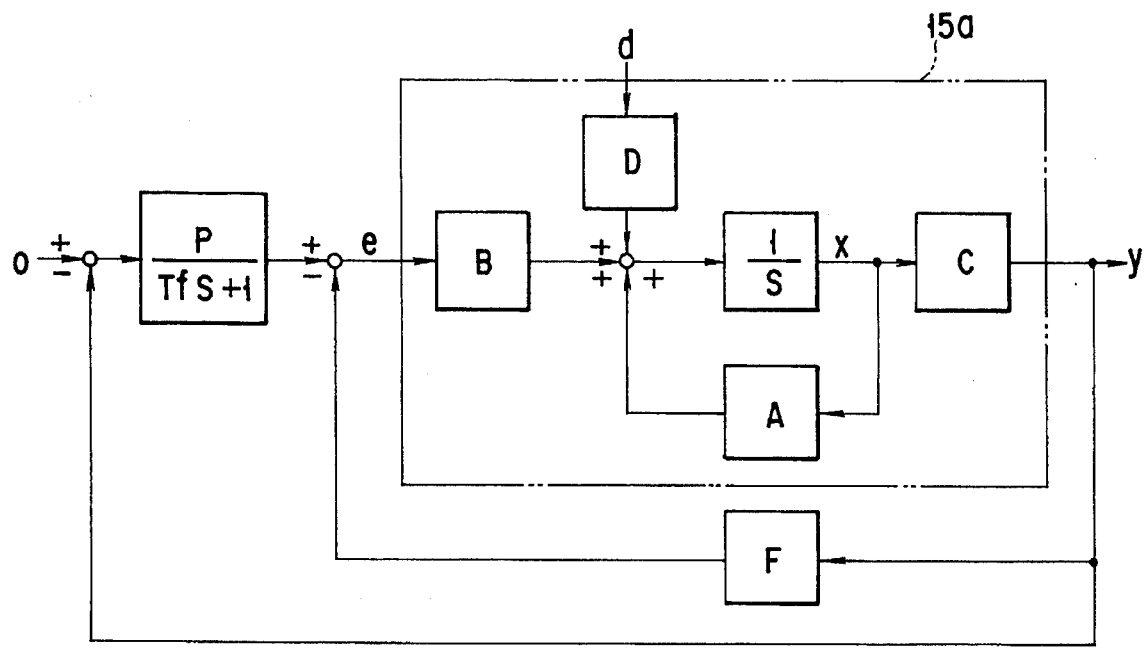
F I G. 14
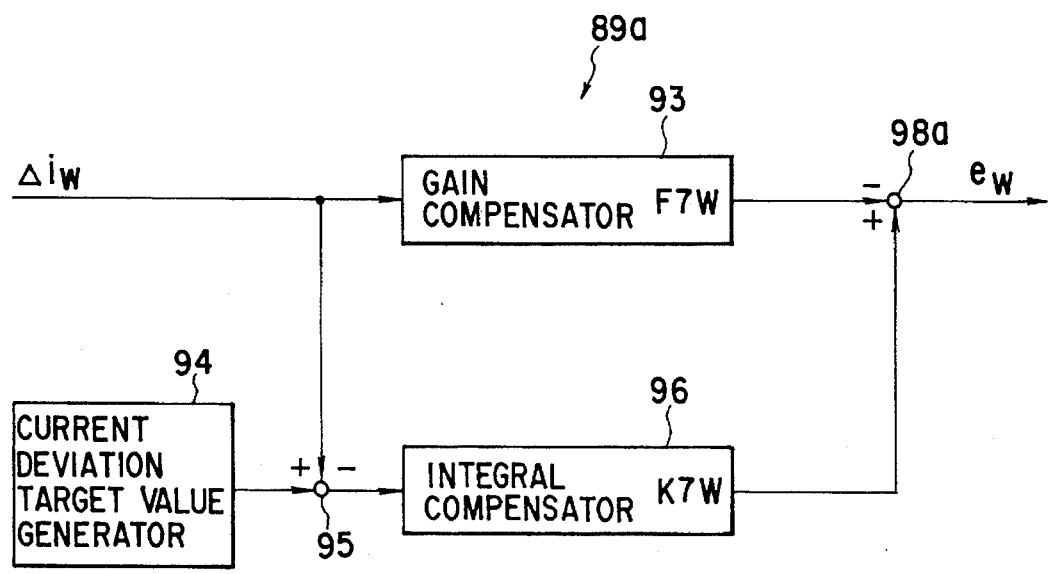
F I G. 15

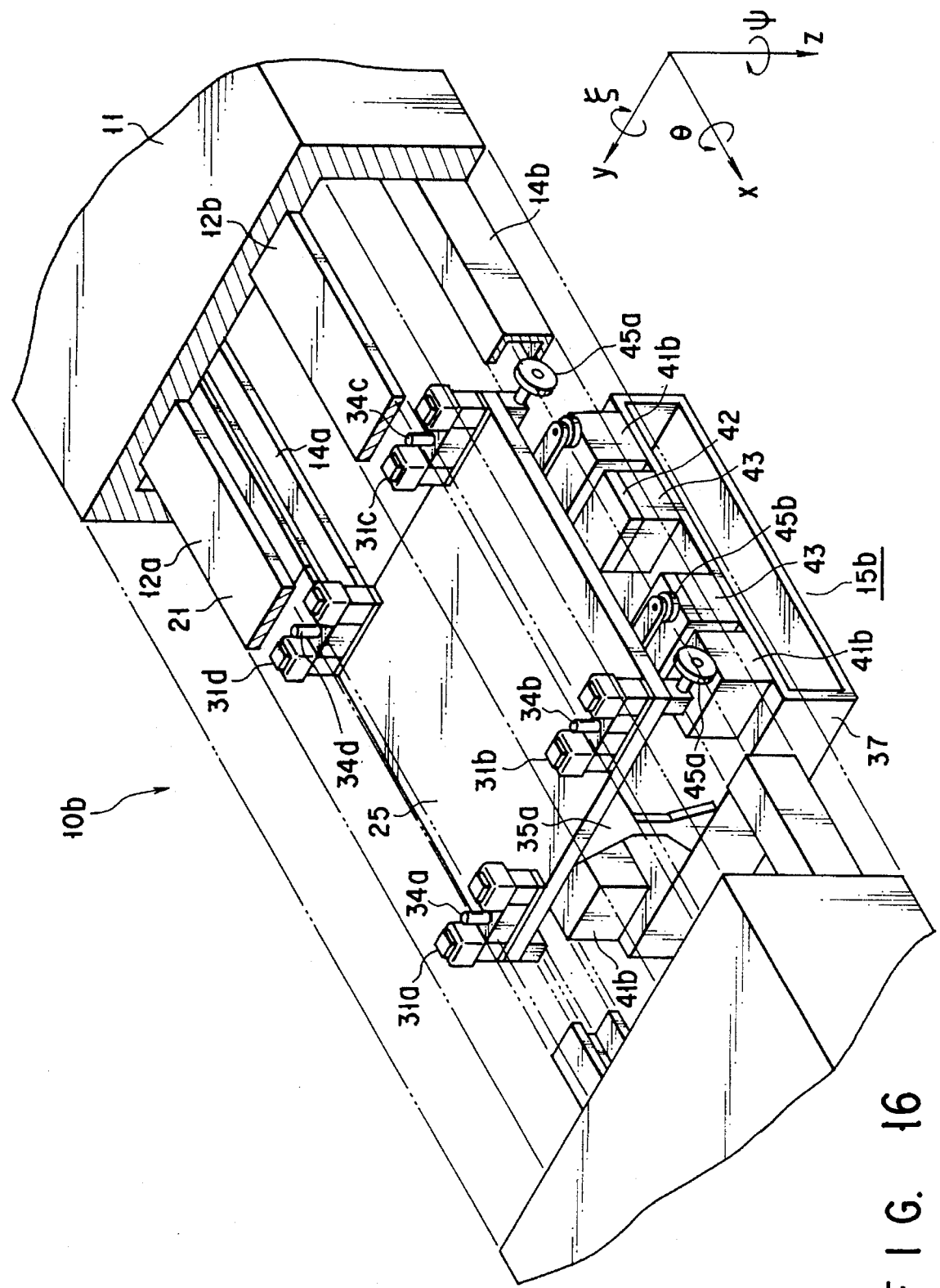
F I G. 16

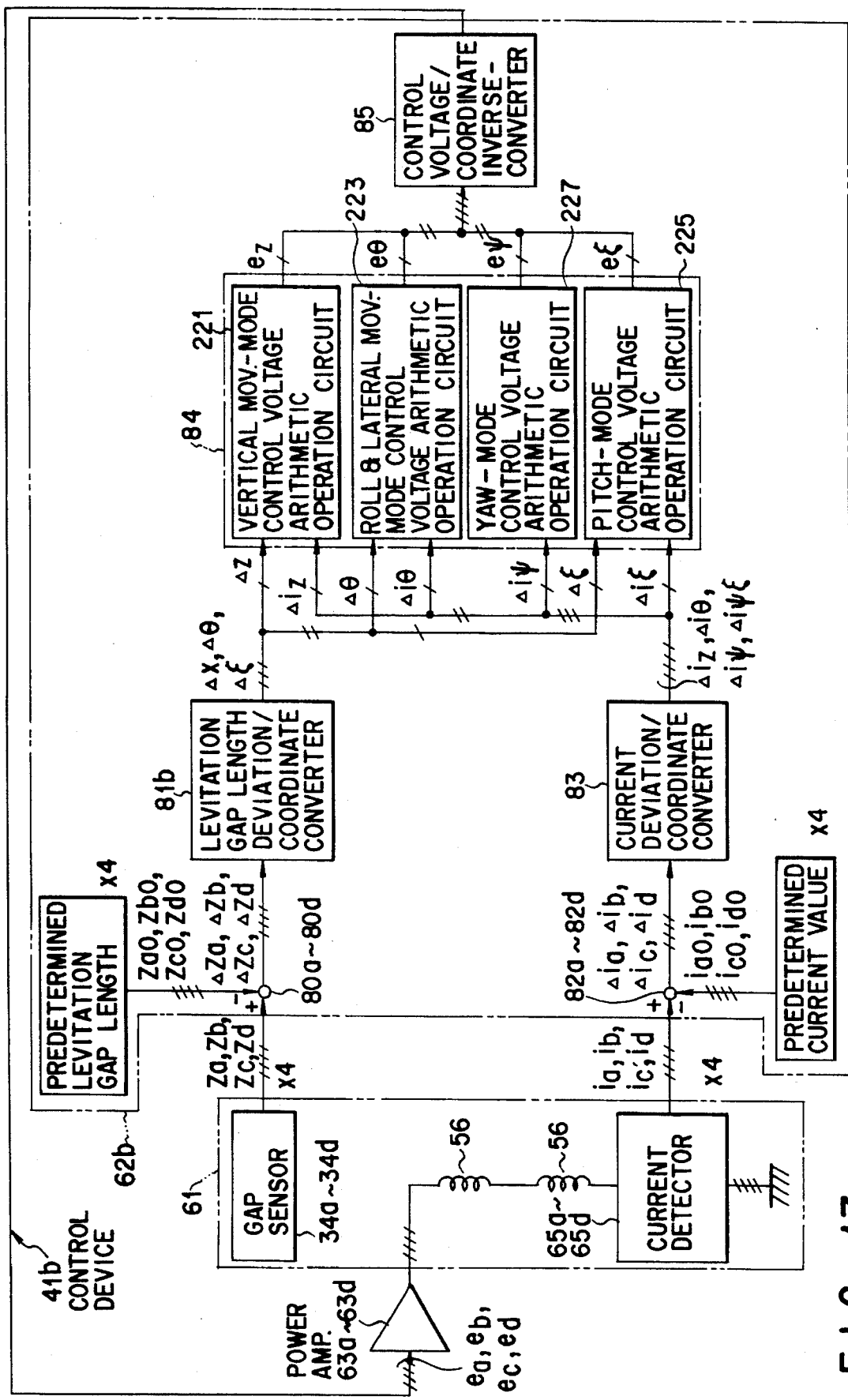
F I G. 17

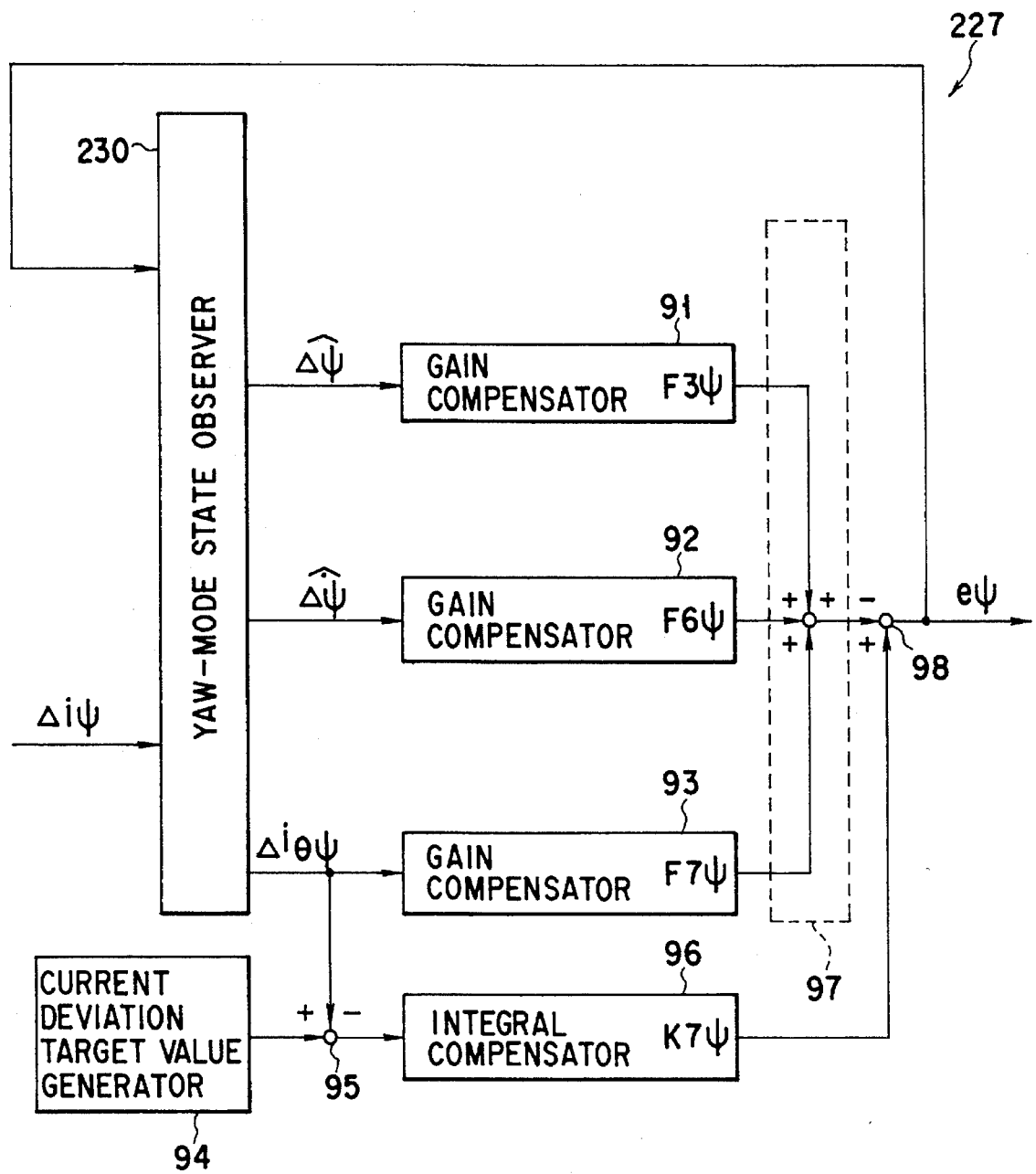
F I G. 19

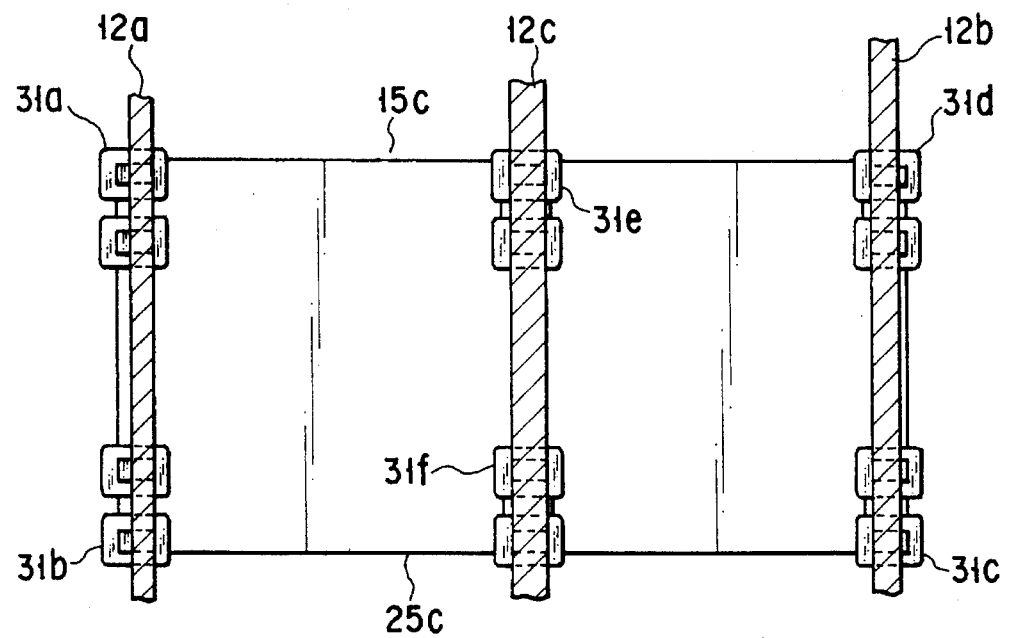
F I G. 20
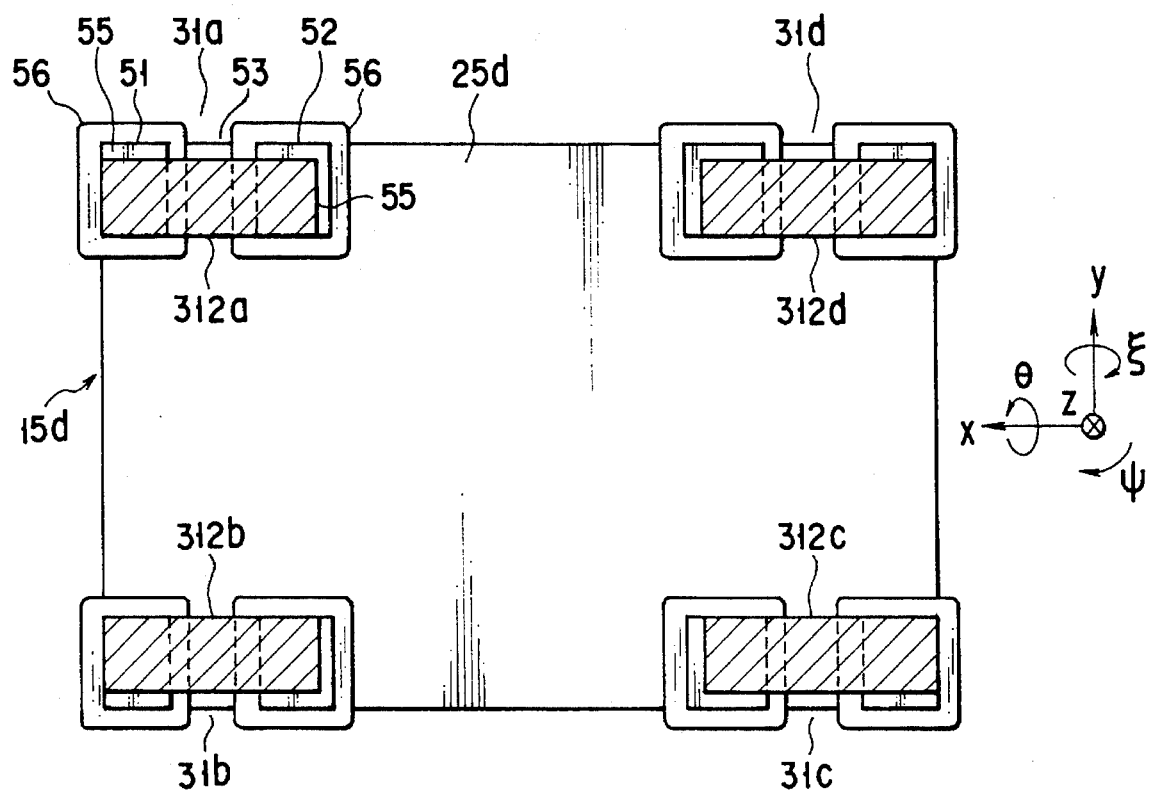
F I G. 21

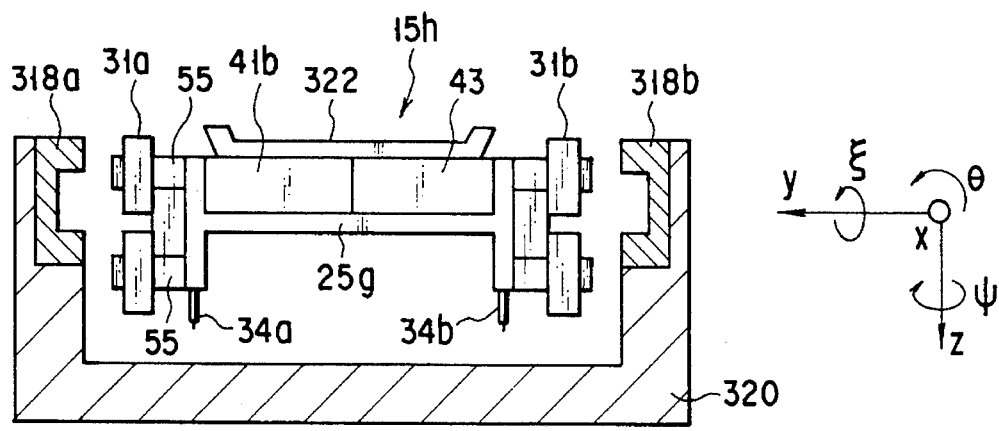
F I G. 26
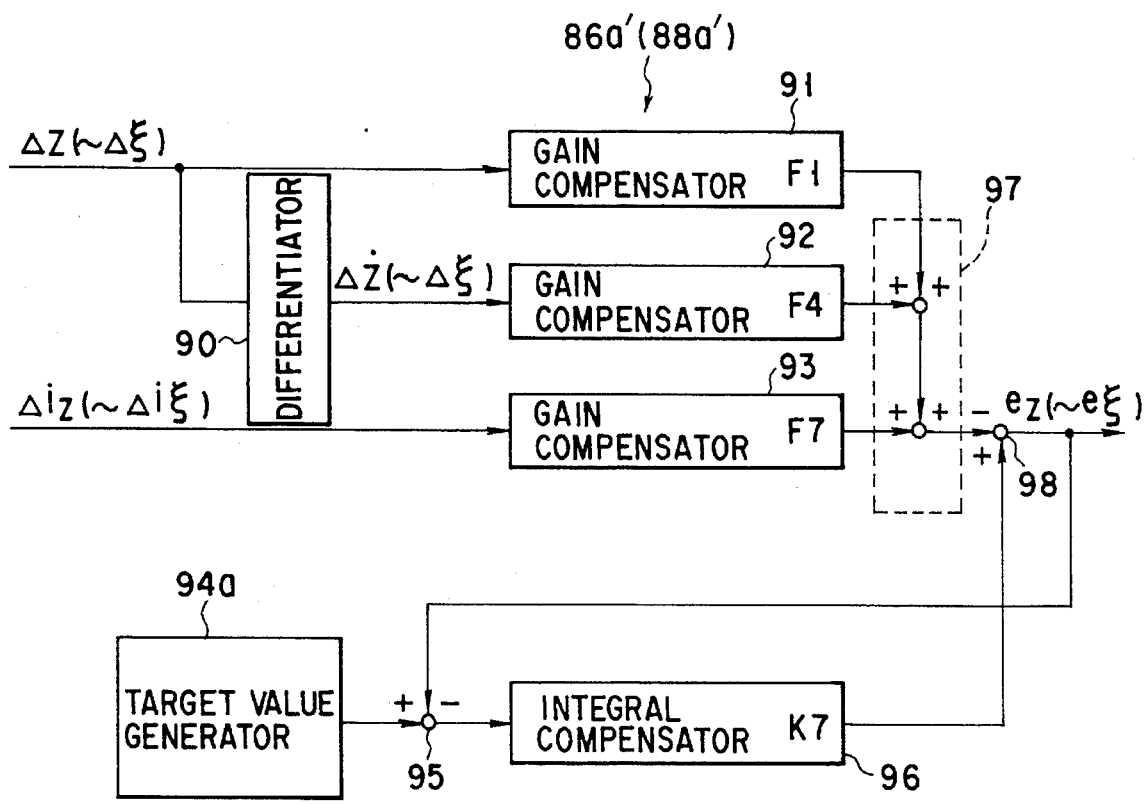
F I G. 27

MAGNETIC LEVITATING APPARATUS

BACKGROUND OF THE INVENTION

1. Field of the Invention

The present invention relates to a magnetic levitating apparatus for levitating a levitated object (a transportation unit) by utilizing a magnetic attraction force, and more particularly to a magnetic levitating apparatus having an improved apparatus maintainability.

2. Description of the Related Art

Recently, as part of office automation, a transportation apparatus is widely used to move semifinished products and documents between a plurality of points in a building. The transportation apparatus used for such a purpose is required to have a function for quickly and quietly moving articles. Besides, a transportation apparatus used in a very clean space such as a clean room is required to produce no dust in operation.

To meet such requirements, this type of transporting apparatus adopts a system in which a transporting vehicle runs along a guide rail in a non-contact state. In particular, a system in which a transporting vehicle is supported by magnetic attraction force in a non-contact state is excellent in tracking a guide rail and in preventing noise and dust.

In the meantime, in the system wherein the transporting vehicle is supported by magnetic attraction, if all magnetic force needed to support the transporting vehicle is to be produced by electromagnets, the electromagnets must be constantly energized and accordingly the power consumption increases.

Under the circumstances, the inventors proposed a levitating transporting apparatus of a so-called zero-feedback control system (hereinafter referred to as "zero power control") (Jap. Pat. Appln. KOKAI Publication No. 61-102105). In this apparatus, a magnetic support unit is constituted by an electromagnet and a permanent magnet. Most of the magnetic force needed to non-contact supporting is produced by the permanent magnet, thereby reducing power consumption.

In order to stably run the levitating transporting apparatus of the zero power control system, a single magnetic support unit is sufficient to support the transporting vehicle. Normally, two or more magnetic support units (e.g. four units at the four corners of the transporting vehicle) must be provided. When the four magnetic support units are provided, it is desirable that the weight of the entire levitating unit be constantly applied to the magnetic support units in unit of ¼. In fact, however, there is an imbalance in distribution of the weight. The imbalance results in the following problem.

The four magnetic support units are all fixed to the transporting vehicle. If gap lengths are determined to produce attraction force equal to the weight, which can be supported by the magnetic force of the permanent magnets included in three of the four magnetic support units, a gap length of the remaining magnetic support unit is geometrically determined by the positions of the three magnetic support units. As a result, the actual gap length of the remaining magnetic support unit does not necessarily coincide with a theoretical gap length for producing the attraction force for supporting the weight shared by this magnetic support unit.

For example, a gap length theoretically designed to support a load of 2 kg may be forcibly changed to a gap length for supporting a load of 3 kg by geometrical conditions. Consequently, in order to eliminate a difference in gap length, the electromagnets of the magnetic support units are energized excessively, resulting in an increase in power supplied to the entire electromagnets. Thus, a large-capacity power supply must be provided, and the size of the entire apparatus increases.

To solve this problem, the inventors proposed a magnetic levitation transporting apparatus, described hereunder, having at least four magnetic support units (Jap. Pat. Appln. KOKAI Publication No. 1-45734). Specifically, pairs of magnetic support units are prepared. Each pair of magnetic support units are supported by a separate division plate. The division plates are coupled by a coupling mechanism so as to be rotatable in a plane vertical to the lower surface of the guide rail. Further, the transporting vehicle is fixed to one of the division plates or divided to correspond to the division plate. With this structure, each magnetic support unit can have freedom of movement in the direction of the gap length. Thereby, each gap length can be automatically adjusted to such a value as to produce attraction force needed to support the weight shared theoretically by each magnetic support unit.

However, there remains a problem with this gap-variable mechanism. When a load, regarded as a solid body, is placed on the transporting vehicle of the levitating transporting apparatus having the gap-variable mechanism, the weight of the load is distributed to at most three magnetic support units. The reason is as follows.

When zero power control is executed, the gap length between each magnetic support unit and a guide rail is set at such a value that the sum of the weight of each magnetic support unit and the load applied to each magnetic support unit is equal to the attraction force of each permanent magnet. The gap length between each magnetic support unit and the guide rail decreases if the weight to be supported increases, and it increases if the weight to be supported decreases, as shown in FIG. 8.

Suppose that a load regarded as solid body is placed on the transporting vehicle having the gap-variable mechanism and four magnetic support units. At this time, if the center of gravity of the load itself is eccentric or an external force is applied to the vehicle, the weight of the load applied to the four magnetic support units increases or decreases.

In the magnetic support unit having an increased load weight, the length of gap between this unit and the guide rail decreases. On the other hand, in the magnetic support unit having a decreased load weight, the length of gap between this unit and the guide rail increases. Thus, the support point at which the load weight is applied to the former magnetic support unit shifts upwards, and the support point at which the load weight is applied to the latter magnetic support unit shifts downwards. The entire load weight is unchanged, and the magnetic attraction force between the magnetic support unit and the guide rail is inversely proportional to the square of the gap length. Thus, the weight supported at the downwardly shifted supported point is newly added to the upwardly shifted support point, and the load weight at the downwardly shifted support point is reduced by the amount which is newly added to the upwardly shifted support point. Accordingly, the gap length of the magnetic support unit having the increased load weight decreases further, and the support point at which the load weight has been applied to the magnetic support unit moves further upwards. Moreover, the gap length of the magnetic support unit having the decreased load weight increases further, and the support point at which the load weight has been applied to the magnetic support unit moves further downwards.

This process is repeated, and as a result the load weight is supported by at most three magnetic support units which are at least necessary for supporting the solid body. In this way, even if the load is placed on the transportation vehicle having the gap-variable mechanism and four or more magnetic support units, the load weight is distributed on at most only three magnetic support units if the solidity of the load is high. Thus, in order to fully support the load weight by any three of the magnetic support units, it is necessary to increase the size of each magnetic support unit or to divide one load to distribute the weight thereof. However, since there is a load which cannot be divided, the size of the magnetic support unit must be increased in order to deal with such a load. As a result, the weight of the transporting vehicle is increased, and accordingly the size of the guide rail and track increases. Consequently, the size of the entire apparatus increases.

To solve the above problem, the inventors proposed an apparatus having an automatic load weight distributing mechanism (Jap. Pat. Appln. KOKAI No. 61-170206). Specifically, an elastic body is interposed in the gap-variable mechanism. This elastic body is defined as follows. It is supposed that an inverse number of variation amount of a gap length per unit weight due to a spring force of an elastic body of a magnetic support unit when a load is applied to the magnetic support unit with the load support point fixed is equal or less than an absolute value of a value obtained by differentiating the attraction force in the direction of gap length of the magnetic support unit by the gap length in the state in which an excitation current of the electromagnet is zero and no load is placed on the transportation vehicle. Thereby, automatic distribution of the load weight to each magnetic support unit can be effected.

However, in the apparatus having the above load weight automatic distributing mechanism, there is the following problem. Specifically, since the inverse number of variation amount of a gap length per unit weight due to a spring force of an elastic body of a magnetic support unit when a load is applied to the magnetic support unit with the load support point of the transporting vehicle fixed is equal or less than an absolute value of a value obtained by differentiating the attraction force in the direction of gap length of the magnetic support unit by the gap length in the state in which an excitation current of the electromagnet is zero and no load is placed on the transportation vehicle, the division plates of the transporting vehicle of division structure may be rotated by the attraction force of the magnetic support unit by means of the aforementioned coupling mechanism when the transporting vehicle is removed from the guide rail. In addition, it is possible that the magnetic support unit may be damaged by collision with the guide rail. Besides, in the case of the transporting vehicle wherein the magnetic support unit is attached to the vehicle via an elastic member, the transporting vehicle may be damaged even if the vehicle is lowered since the magnetic support unit exerts attraction force to the guide rail and the elastic member is deformed excessively. Thus, when the transporting vehicle is disengaged from the guide rail for the purpose of maintenance or the like, it is necessary to fix the division plate and all magnetic support units to the vehicle or to lower all the magnetic support units to disengage the transporting vehicle from the guide rail. Consequently, the maintainability of the apparatus is degraded.

As has been described above, in the prior art, the inverse number of variation amount of a gap length per unit weight due to a spring force of an elastic body of a magnetic support unit when a load is applied to the magnetic support unit with the load support point of the transporting vehicle fixed is equal or less than an absolute value of a value obtained by differentiating the attraction force in the direction of gap length of the magnetic support unit by the gap length in the state in which an excitation current of the electromagnet is zero and no load is placed on the transportation vehicle. That is, the mechanical spring force acting on the magnetic support unit is weaker than the magnetic spring force acting on the magnetic support unit when no load is placed on the vehicle. Thus, when the transporting vehicle is disengaged from the guide rail, it is necessary to fix the division plate and all magnetic support units to the vehicle or to lower all the magnetic support units, in order to prevent the apparatus from being damaged. Therefore, it is difficult to perform maintenance of the entire apparatus by disengaging the transporting vehicle from the guide rail. Furthermore, when the transporting vehicle is not disengaged from the guide rail, orbit structural elements such as guide rail becomes an obstacle and maintenance of the entire transporting vehicle cannot be performed.

SUMMARY OF THE INVENTION

The object of the present invention is to provide a magnetic levitating apparatus wherein a transportation vehicle can easily been removed from a guide rail without causing any damage to the apparatus, with excellent maintainability.

This object can be achieved by a magnetic levitating apparatus comprising:

a guide rail having at least a portion thereof formed of a magnetic material;

a levitated object supported by the guide rail in a non-contact state;

a plurality of magnetic support units for magnetically levitating the levitated object, each of the magnetic support units having an electromagnet and a permanent magnet, the electromagnet and the permanent magnet constituting a magnetic circuit with the guide rail;

a plurality of gap-variable mechanisms for varying gap lengths between the magnetic support units and the guide rail independently, each of the gap-variable mechanisms having an elastic member situated between an associated one of the magnetic support units and the levitated object;

a sensor unit for sensing the state of the magnetic circuit of each of the magnetic support units; and control means for effecting zero power levitation force control and specific control, the zero power levitation force control being effected to reduce to zero an excitation current to the electromagnet of at least one of the magnetic support units thereby to stabilize the magnetic levitation state of the levitated object on the basis of an output from the sensor unit, the specific control being effected to control an excitation current to the electromagnet of at least one of the magnetic support units thereby to have the zero power levitation force control effected irrespective of the magnitude of a spring constant of the elastic member, on the basis of the output of the sensor unit.

The above object can also be achieved by a magnetic levitating apparatus comprising:

a guide rail having at least a portion thereof formed of a magnetic material;

a levitated object supported by the guide rail in a non-contact state;

a plurality of magnetic support units for magnetically levitating the levitated object, each of the magnetic support units having an electromagnet and a permanent magnet, the electromagnet and the permanent magnet constituting a magnetic circuit with the guide rail;

a sensor unit for sensing the state of the magnetic circuit of each of the magnetic support units; and control means for effecting zero power levitation force control and specific control, the zero power levitation force control being effected to reduce to zero an excitation current to the electromagnet of at least one of the magnetic support units thereby to stabilize the magnetic levitation state of the levitated object on the basis of an output from the sensor unit, the specific control being effected to vary a levitation gap length of each of the magnetic support units independently on the basis of the output of the sensor unit.

According to the present invention having the above structures, even if the mechanical spring force of the gap-variable mechanisms acting on the magnetic support units is increased to a necessary level, the zero power control of the levitated object can be effected. All magnetic support units can vary their levitation gap lengths independently. For example, a division structure of a vehicle can be adopted. In addition, it is possible to avoid the use of a gap-variable mechanism which applies to the magnetic support unit a mechanical spring force weaker than the magnetic spring force acting on the magnetic support unit at the time no load is placed on the vehicle. Accordingly, unlike the prior art, it is not necessary to fix the division plates and all magnetic support units or lower all magnetic support units so as not to cause damage to the apparatus when the levitated object is removed from the guide rails. Instead, the levitated object can be regarded as a solid body and a given part can be held. Thus, the levitated object can be easily removed from the guide rails. Therefore, the maintainability of the magnetic levitating apparatus can be remarkably enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a control block diagram showing a magnetic levitating control system in the control apparatus;

FIG. 8 is a graph showing the relationship between the length of gap between the magnetic support unit and a guide rail and the attraction force produced by the permanent magnet of the magnetic support unit;

FIG. 11 is a block diagram showing the structure of a vertical movement mode control voltage arithmetic operation circuit in the control apparatus;

FIG. 12 is a control block diagram showing a vertical movement mode magnetic levitation control system in the magnetic levitating apparatus;

FIG. 14 is a control block diagram showing a pitch mode magnetic levitation control system in the magnetic levitating apparatus;

FIG. 15 is a block diagram showing the structure of a twist mode control voltage arithmetic operation circuit in the control apparatus;

FIG. 16 is a perspective view of an important portion of a magnetic levitating apparatus according to still another embodiment of the present invention;

FIG. 17 is a block diagram showing the structure of a control apparatus in this magnetic levitating apparatus;

FIG. 19 is a block diagram showing the structure of a yaw mode control voltage arithmetic operation circuit in the control apparatus;

FIG. 20 is a plan view showing a magnetic levitating apparatus according to still another embodiment of the invention;

FIG. 21 is a plan view showing a magnetic levitating apparatus according to still another embodiment of the invention;

FIG. 26 is a vertical cross-sectional view showing a magnetic levitating apparatus according to still another embodiment of the invention;

FIG. 27 is a block diagram showing part of a modification of a control voltage arithmetic operation circuit;

FIG. 29 is a control block diagram of a magnetic levitating control system in which the arithmetic operation circuit is built in.

DETAILED DESCRIPTION OF THE PREFERRED EMBODIMENTS

The principle of the present invention will now be described in detail from the standpoint of a control system of the invention, following which preferred embodiments of the invention will be described.

Figure 1:
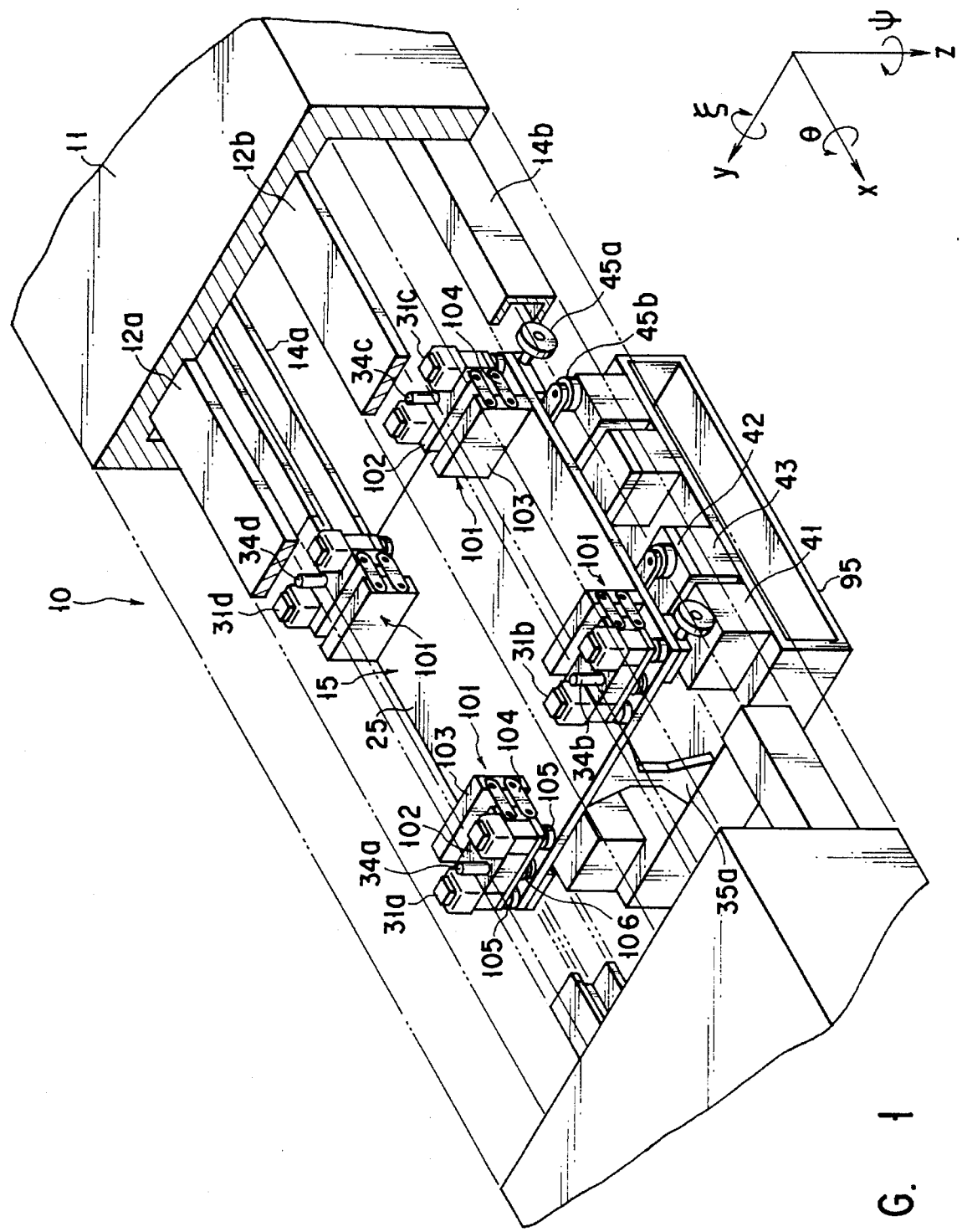
FIG. 1 is a perspective view of an important portion of a magnetic levitating apparatus according to an embodiment of the present invention.
Figure 2:
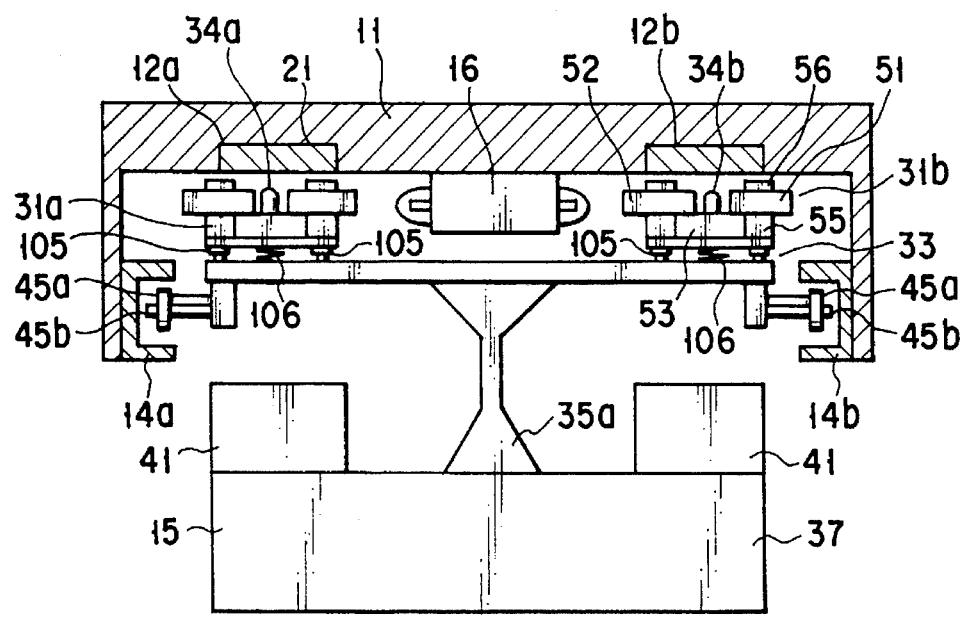
FIG. 2 is a vertical cross-sectional view of the important portion shown in FIG. 1.
Figure 3:
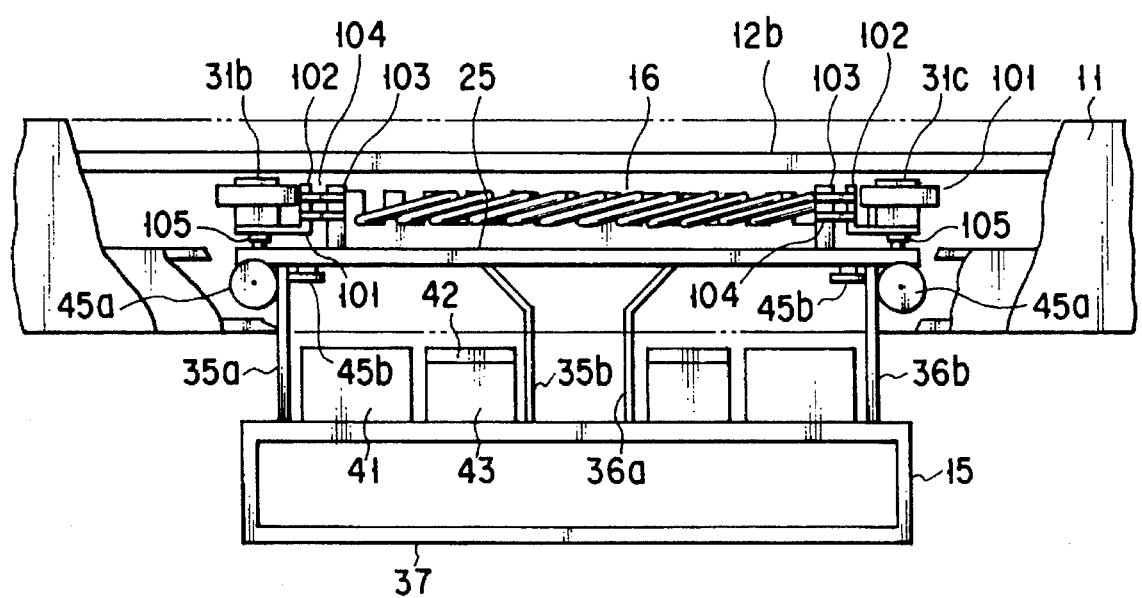
FIG. 3 is a partially cut-out side view of the important portion shown in FIG. 1.

FIGS. 1 to 3 show a typical structure of an levitated object in a magnetic levitating apparatus of the present invention. This apparatus comprises guide rails 12a and 12b, a levitated object 15, and magnetic support units 31a to 31d attached to the four corners of a base 25 with gap-variable mechanisms 101 interposed. The base 25 is a part of the levitated object 15. The levitated object 15 is supported in a non-contact state by the magnetic attraction produced by the magnetic support units 31a to 31d.

As is shown in FIG. 2, each of the magnetic support units 31a to 31d comprises a permanent magnet 53 and electromagnets 51 and 52 situated on both sides of the permanent magnet 53 and connected to mutually increase magnetic fluxes produced by the electromagnets 51 and 52. An excitation current to the electromagnets 51 and 52 is controlled to control the magnetic attraction of the magnetic support units 31a to 31d caused by the permanent magnet 53. The magnetic support units 31a to 31d, as shown in FIG. 2, are situated to face each other such that they are displaced outwards with respect to the guide rails 12a and 12b and they can exert a levitating force and a guide force to the levitating object 15.

The gap-variable mechanisms 101 comprise, respectively, L-shaped base seats 102 to which the magnetic support units 31a to 31d are attached, back plates 103 fixed to the four corners on the upper surface of the base 25, four rod members 104 constituting parallel link mechanisms by rotatably coupling the base seats 102 and side faces of the back plates 103 by means of pins, two oil dampers 105 fixed to the lower surfaces of the base seats 102 and the upper surface of the base 25, and coil springs 106 interposed between the two oil dampers 105 between the lower surfaces of the base seats 102 and the upper surface of the base 25.

An inverse number k of a variation amount, per unit weight, of the gap due to the spring force of the coil spring 106, when the base 25 is fixed and a load is applied to the magnet unit, is greater than an absolute value of a value obtained by differentiating the attraction in the direction of gap variation of the magnet unit by the gap length at the time when the excitation current to the electromagnet is zero and a maximum load is placed on the levitated object. For the purpose of simplicity, the value k is termed "spring constant."

The levitated object 15 is composed of various parts which will be described later. A description thereof is now omitted for the purpose of simplicity.

Suppose that the levitated object 15 is levitated with a maximum load mounted thereon.

Supposing that the center of gravity of the levitated object 15 lies at the center of the levitated object, movement formulae of movement of the levitated object 15 and voltage formulae of excitation voltage applied to the electromagnets of magnetic support units a to 31d are linearized in the substantially normal levitation state on the basis of a coordinate system shown in FIG. 1 and expressed in four modes: vertical movement of the center of gravity (z-direction), rolling around the center of gravity ($\theta$-direction), pitching around the center of gravity ($\xi$-direction), and distortional movement of a plane defined by tip end portions of the magnetic support units 31a to 31d ($\theta_\phi$-direction). By coordinate-converting formulae (1) and (2), formulae (3) to (6) are obtained.

$$\begin{cases} \Delta z = \frac{1}{4}(\Delta z_a + \Delta z_b + \Delta z_c + \Delta z_d) \\ \Delta z_L = \frac{1}{4}(\Delta z_{La} + \Delta z_{Lb} + \Delta z_{Lc} + \Delta z_{Ld}) \\ \Delta\theta = \frac{1}{q_\theta}(\Delta z_a - \Delta z_b - \Delta z_c + \Delta z_d) \\ \Delta\theta_L = \frac{1}{2q_\theta}(\Delta z_{La} - \Delta z_{Lb} - \Delta z_{Lc} + \Delta z_{Ld}) \\ \Delta\xi = \frac{1}{2q_\xi}(-\Delta z_a - \Delta z_b + \Delta z_c + \Delta z_d) \\ \Delta\xi_L = \frac{1}{2q_\xi}(=\Delta z_{La} - \Delta z_{Lb} + \Delta z_{Lc} + \Delta z_{Ld}) \\ \Delta\xi\psi = \frac{1}{q_\theta}(\Delta z_a - \Delta z_b + \Delta z_c - \Delta z_d) \end{cases} \quad (1)$$

$$\begin{cases} \Delta i_z = \frac{1}{4}(\Delta i_a + \Delta i_b + \Delta i_c + \Delta i_d) \\ \Delta i_\theta = \frac{1}{q_\theta}(\Delta i_a - \Delta i_b - \Delta i_c + \Delta i_d) \\ \Delta i_\xi = \frac{1}{2q_\xi}(-\Delta i_a - \Delta i_b + \Delta i_c + \Delta i_d) \\ \Delta i_{\theta q} = \frac{1}{q_\theta}(\Delta i_a - \Delta i_b + \Delta i_c - \Delta i_d) \end{cases} \quad (2)$$

$$\begin{cases} 4m\Delta z = 4\left(\left(\frac{\partial F_z}{\partial z}\right) - k\right)\Delta z + 4k\Delta z_L - 4\gamma\Delta z + \\ \qquad\qquad 4\gamma\Delta z_L + 4\left(\frac{\partial F_z}{\partial i}\right)\Delta i_z + 4u_z \\ M\Delta z_L = 4k\Delta z - 4k\Delta z_L + 4\gamma\Delta z - 4\gamma\Delta z_L + u_L \\ L_{zo}\Delta i_z = -N\left(\frac{\partial\phi}{\partial z}\right)\Delta z - R\Delta i_z + e_z \end{cases} \quad (3)$$

$$\begin{cases} mq_\theta\Delta\theta = \left(\left(\frac{\partial F_z}{\partial z}\right)q_\theta - q_\theta k\right)\Delta\theta + 2q_\theta k\Delta\theta_L - \\ \qquad q_\theta\gamma\Delta\theta + 2q_\theta r\Delta\theta_L + \left(\frac{\partial F}{\partial i}\right)q_\theta\Delta i_\theta + \\ \qquad q_\theta u_\theta \\ I_\theta\Delta\theta_L = \frac{1}{2}q_\theta 2\Delta\theta - q_\theta 2k\Delta\theta_L + \frac{1}{2}q_\theta 2\gamma\Delta\theta - \\ \qquad q_\theta 2\gamma\Delta\theta_L + T_\theta \\ L_{zo}q_\theta\Delta i_\theta = -N\left(\frac{\partial\phi}{\partial z}\right)q_\theta\Delta\theta - Rq_\theta\Delta i_\theta + q_\theta e_\theta \end{cases} \quad (4)$$

-continued $$\begin{cases} mq_\xi\Delta\dot{\xi} = \left(\left(\dfrac{\partial F_z}{\partial z}\right)q_\xi - q_\xi k\right)\Delta\xi + q_\xi k\Delta\xi_L - q_\xi r\Delta\dot{\xi} + \\ \qquad q_\xi r\Delta\dot{\xi}_L + \left(\dfrac{\partial F_z}{\partial i}\right)q_\xi\Delta i_\xi + q_\xi u_\xi \\ I_\xi\Delta\ddot{\xi}_L = q_\xi 2k\Delta\xi - q_\xi 2k\Delta\xi_L + q_\xi 2\gamma\Delta\dot{\xi} - q_\xi 2\gamma\Delta\dot{\xi}_L + T_\xi \\ L_{zo}q_\xi\Delta\dot{i}_\xi = -N\left(\dfrac{\partial\phi}{\partial z}\right)q_\xi\Delta\dot{\xi} - Rq_\xi\Delta i_\xi + q_\xi e_\xi \end{cases} \quad (5)$$

$$\begin{cases} mq_\theta\Delta\ddot{\theta}_\psi = \left(\left(\dfrac{\partial F_z}{\partial z}\right)q_\theta - q_\theta k\right)\Delta\theta_\psi - q_\theta\gamma\Delta\dot{} + \\ \qquad \left(\dfrac{\partial F_z}{\partial i}\right)q_\theta\Delta i_{\theta\psi} + q_\theta u_{\theta\psi} \\ L_{zo}q_\theta\Delta\dot{i}_{\theta\psi} = -N\left(\dfrac{\partial\phi}{\partial z}\right)q_\theta\Delta\dot{\theta}_\psi - Rq_\theta\Delta i_{\theta\psi} + q_\theta e_{\theta\psi} \end{cases} \quad (6)$$

Attached letters "a", "b", "c" and "d" correspond to the magnetic support units 31a to 31d, and Δ represents a deviation from the normal levitation state. Symbol $z_i$(i=a to d) represents the levitation gap length, and $i_i$(i=a to d) represents an excitation current of the magnetic support unit. Symbol "z" indicates a height from the lower surface of the guide rail 12a (12b) to the center of the plane defined by connecting tip end portions of the magnetic support units 31a to 31d. Symbol "$z_L$" represents a distance between the lower surface of the guide rail 12a, 12b and the upper surface of the base 25 situated below the magnetic support units a to 31d. Symbol θ represents the sum of roll angles of a straight line connecting the tip ends of the magnetic support units 31a and 31b and a straight line connecting the tip ends of the magnetic support units 31c and 31b. Symbol $\theta_L$ represents the roll angle of the base 25. Symbol $\theta_\phi$ represents a difference between roll angles of a straight line connecting the tip ends of the magnetic support units 31a and 31b and a straight line connecting the tip ends of the magnetic support units 31c and 31b. Symbol ξ represents an average value of pitch angles of a straight line connecting the connecting the tip ends of the magnetic support units 31a and 31d and a straight line connecting the tip ends of the magnetic support units 31b and 31c. Symbol $\xi_L$ represents a pitch angle of the base 25, and "m" represents the mass of each of the magnetic support units 31a to 31d. Symbol M indicates the mass of the levitated object 15 excluding the magnetic support units 31a to 31d, "θ" indicates an inertia moment, and "$I_\xi$" indicates an inertia moment about y-axis. Symbols "qθ" and "qξ" represent, respectively, distances parallel to the y-axis and z-axis of the magnetic support units 31a to 31d, and "k" represents a spring constant (k>0) of the gap-variable mechanism 101. Symbol γ represents a damping constant (γ>0) of the gap-variable mechanism 101, "$f_z$" represents a z-axis attraction of the magnetic support unit 31a, and φ represents a main magnetic flux of the magnetic support units 31a to 31d.

In addition, ∂/∂v (v=z, i) represents a deviation operator of a function with respect to a variable v, and (∂/∂v) represents a deviation value of a function in the normal levitation state of the levitated object 15.

Symbols $L_{zo'}$ and R represent the self-inductance and electric resistance of the coil 56 when the levitated object is levitated with a designed gap length. Symbols "$u_z$" denotes an external force parallel to the z-axis applied to the magnetic support units 31a to 31d, and "$u_L$" denotes an external force parallel to the z-axis applied to the parts excluding the magnetic support units 31a to 31d. Symbols "qθ", "uθ", "qξ" and "uξ" represent a torque disturbance about x-axis and a torque disturbance about y-axis applied to the magnetic support units 31a to 31d, and symbols Tθ and Tξ represent a torque disturbance about x-axis and a torque disturbance about y-axis applied to the parts excluding magnetic support units 31a to 31d. Symbol "qθφuθφ" represents a torque disturbance about x-axis contributing to distortional movement of a plane defined by the tip ends of the magnetic support units 31a to 31d. Symbol "." denotes a first-stage time differentiation.

In this description, formula (3) is referred to as z-mode, formula (4) as θ-mode, formula (5) as ξ-mode, and formula (6) as $\theta_\phi$-mode. Formulae (3), (4), (5) and (6) can be combined into the following state equation.

Specifically, state vectors $X_3$ and $X_5$ are expressed as follows:

$$\begin{aligned} x_3 &= (\Delta\theta_\psi\ \Delta\dot{\theta}_\psi\ \Delta i_{\theta\psi})^T \\ x_5 &= (\Delta z\ \Delta L\ \Delta\dot{z}\ \Delta\dot{z}L\ \Delta i_z)^T \\ &\quad (\Delta\theta\ \Delta\theta L\ \Delta\dot{\theta}\ \Delta\dot{\theta}L\ \Delta i_\theta)^T\ \text{or} \\ &\quad (\Delta\xi\ \Delta\xi L\ \Delta\dot{\xi}\ \Delta\dot{\xi}L\ \Delta i_\xi)^T \end{aligned}$$

As to $x_3$, $x_5$, the following two types of state equations are obtained:

$$\dot{x}_3 = A_3 x_3 + b_3 e_3 + D_3 d_3 \quad (7)$$

$$\dot{x}_5 = A_5 x_5 + b_5 e_5 + D_5 d_5 \quad (8)$$

Symbols $A_3$, $b_3$, $D_3$, $d_3$, $A_5$, $b_5$, $D_5$, $d_5$ represent the following matrix:

$$A_3 = \begin{pmatrix} 0 & 1 & 0 \\ a_{41} & a_{44} & a_{47} \\ 0 & a_{74} & a_{77} \end{pmatrix}, b_3 = \begin{pmatrix} 0 \\ 0 \\ b_{71} \end{pmatrix}, d_3 = \begin{pmatrix} 0 \\ 0_{41} \\ b \end{pmatrix}, d_3 = u$$

$$A_5 = \begin{pmatrix} 0 & 0 & 1 & 0 & 0 \\ 0 & 0 & 0 & 1 & 0 \\ a_{41} & a_{42} & a_{44} & a_{45} & a_{47} \\ a_{51} & a_{52} & a_{54} & a_{55} & 0 \\ 0 & 0 & a_{74} & 0 & a_{77} \end{pmatrix}, b_5 = \begin{pmatrix} 0 \\ 0 \\ 0 \\ 0 \\ b_{71} \end{pmatrix},$$

$$D_5 = \begin{pmatrix} 0 & 0 \\ 0 & 0 \\ d_{41} & 0 \\ 0 & d_{52} \\ 0 & 0 \end{pmatrix} \quad d_5 = \begin{pmatrix} u_\theta \\ T_\theta \end{pmatrix} \text{ or } \begin{pmatrix} u_\xi \\ T_\xi \end{pmatrix}$$

Control voltages $e_3$ and $e_5$ for stabilizing the respective modes are:

$$e_3 = e\theta\phi$$

$e_5 = e_z, e_\theta, e_\xi$

Control voltages to the magnetic support units 31a to 31d are given by the following formula:

$$\begin{cases} e_a = e_z + \dfrac{q_\theta}{4} e_\theta + \dfrac{q_\theta}{4} e_{\theta\psi} - \dfrac{q_\xi}{2} e_\xi \\ e_b = e_z + \dfrac{q_\theta}{4} e_\theta - \dfrac{q_\theta}{4} e_{\theta\psi} - \dfrac{q_\xi}{2} e_\xi \\ e_c = e_z + \dfrac{q_\theta}{4} e_\theta + \dfrac{q_\theta}{4} e_{\theta\psi} + \dfrac{q_\xi}{2} e_\xi \\ e_d = e_z + \dfrac{q_\theta}{4} e_\theta - \dfrac{q_\theta}{4} e_{\theta\psi} + \dfrac{q_\xi}{2} e_\xi \end{cases} \quad (9)$$

In order to stabilize the magnetic levitation state of the levitated object 15 while gradually reducing the excitation currents of the magnetic support units 31a to 31d to zero, the zero power control disclosed in Jap. Pat. Appln. KOKAI No. 61-102105 is applied to each mode. For the purpose of simplicity, the current integration type control will now be considered.

FIG. 7 is a control block diagram. Symbol F denotes a feedback gain compensator, and symbol K an integration compensator.

In the $\theta_j$ mode, the feedback gain compensator F and integration compensator K are expressed by $F = (F_{1\theta\phi}, F_{4\theta\phi}, F_{7\theta\phi})(\theta_\phi \text{mode})$, $K = (0, 0, K_{7\theta\phi})(\theta_\phi \text{mode})$ In the other modes, the feedback gain compensator F and integration compensator K are expressed by $F = (F_{1i}, F_{4i}, F_{7i})(i=z, \theta, \xi)$ $K = (0, 0, K_{7i}) (i=z, \theta, \xi)$ An output matrix C in the $\theta_\phi$ is a unit matrix corresponding to the number of orders. The output matrix C in the other modes is as follows:

$$C = \begin{pmatrix} 1 & 0 & 0 & 0 & 0 \\ 0 & 0 & 1 & 0 & 0 \\ 0 & 0 & 0 & 0 & 1 \end{pmatrix}$$

Symbol A represents $A_3$ and $A_5$, symbol b represents $b_3$ and $b_5$, and symbol y represents $Cx$ ($x=x_3, x_5$). Similarly, in the following description, symbol D represents $D_3$ and $D_5$, symbol d represents $d_3$ and $d_5$, and symbol e represents $e_3$ and $e_5$.

In the case where the above zero power control is applied to each mode, in order that each mode is stable with I being a unit matrix having the number of orders equal to the number of orders of a corresponding mode, it is necessary that a constant term of a multi-term formula of s of the left side in the following s-characteristic formula be a positive value:

$$det[sI - A + bFC + bKC/s]s = 0 \quad (10)$$

The constant term of the multi-term formula of s of formula (10), as calculated for each mode, is as follows:

$$z \text{ mode}: -\dfrac{4k}{mML_{zo}} K_{7z} \times \left( \dfrac{\partial F_z}{\partial z} \right) \quad (11)$$

$$\theta \text{ mode}: -\dfrac{q_\theta 2K}{mI_\theta L_{zo}} K_{7\theta} \times \left( \dfrac{\partial F_z}{\partial z} \right) \quad (12)$$

$$\xi \text{ mode}: -\dfrac{q_\xi 2k}{mI_\xi L_{zo}} K_{7\xi} \times \left( \dfrac{\partial F_z}{\partial z} \right) \quad (13)$$

$$\theta_\phi \text{ mode}: \dfrac{1}{mL_{zo}} \left( k - \left( \dfrac{\partial F_z}{\partial z} \right) \right) K_{7\theta\phi} \quad (14)$$

In this case, since $(\partial fz/\partial z) > 0$, it is necessary that the following formula be satisfied in each of z-mode, θ-mode and ξ-mode:

$$k7i(i=z, \theta, \xi) < 0 \quad (15)$$

In the $\theta_\phi$ the formula (16) holds true, and therefore formula (17) is required:

$$k > (\partial fz/\partial z) \quad (16)$$

$$k7\theta\xi > 0 \quad (17)$$

Even when the magnet units 31a to 31d are directly fixed on the base 25, the same condition is required if K→∞.

In the levitated object 15 constructed such that the spring constant k of the gap-variable mechanism 101 is given by formula (16), $K_{7z}$ and $K_{7\xi}$ correspond to the control constant of the aforementioned first zero power feedback loop, and $K_{7\theta}$ and $K_{7\phi}$ correspond to the control constant of the aforementioned second zero power feedback loop. Among control constants of the second zero power feedback loop, $K_{7\theta\phi}$ must be set to be different from a code of the control constant of the first zero power feedback loop in order to stabilize the magnetic levitation state of the levitated object 15.

Accordingly, as is clear from FIG. 7, if $\Delta i_z$, $\Delta i_{86}$, and $\Delta i_\theta$, which become inputs of the first and second zero power feedback loops, are positive (negative) values, outputs of these zero power feedback loops, too, become positive (negative) values on the basis of formula (15). On the other hand, if $\Delta i_{\theta\phi}$ which becomes an input to another second zero power feedback loop, is a positive (negative) value, an output of this zero power feedback loop is a negative (positive) value on the basis of formula (17).

Thereby, even if the mechanical spring force of the gap-variable mechanism acting on the magnetic support unit is increased to a necessary level, the zero power control of the levitated object 15 can be effected. All magnetic support units can vary their levitation gap lengths independently. For example, a division structure of a vehicle can be adopted. In addition, it is possible to avoid the use of a gap-variable mechanism which applies to the magnetic support unit a mechanical spring force weaker than the magnetic spring force acting on the magnetic support unit at the time no load is placed on the vehicle.

Accordingly, unlike the prior art, it is not necessary to fix the division plates and all magnetic support units or lower all magnetic support units so as not to cause damage to the apparatus when the levitated object is removed from the guide rails. Instead, the levitated object can be regarded as a solid body and a given part can be held. Thus, the levitated object can be easily removed from the guide rails. Therefore, the maintainability of the magnetic levitating apparatus can be remarkably enhanced.

Preferred embodiments of the present invention based on the above-described principle will now be described.

FIGS. 1 to 4 show important portions of a magnetic levitating apparatus according to an embodiment of the invention.

In these figures, a track frame 11 has an inverted U-cross section and it is extended so as to avoid an obstacle, e.g. in a office space. Two guide rails 12a and 12b are extended in parallel under the upper wall portion of the track frame 11.

The guide rails 12a and 12b are formed of ferromagnetic plate members. Emergency guides 14a and 14b having bracket (])-shaped cross sections are provided on inner side walls of the track frame 11 such that their open sides face each other.

A levitated object 15 is situated so as to be movable along the guide rails 12a and 12b below the guide rails 12a and 12b. As is shown in FIGS. 2 and 3, a stator 16 of a linear induction motor is situated on the lower surface of the upper wall portion of the track frame 11 between the guide rails 12a and 12b, such that the stator 16 extends along the guide rails 12a and 12b with a predetermined distance therebetween.

The levitated object 15 has a flat base 25 situated to face the lower surfaces of the guide rails 12a and 12b. Four magnetic support units 31a to 31d are mounted on the four corners of the upper surface of the base 25 with gap-variable mechanisms 101 interposed. Optical gap sensors 34a to 34d for detecting gap lengths between the respective units and the lower surfaces of the guide rails 12a and 12b are attached to the magnetic support units 31a to 31d.

A container 37 for containing articles to be conveyed are attached to the lower surface of the base 25 via coupling members 35a, 35b, 36a and 36b, as shown in FIG. 3.

Control devices 41 for magnetically levitating the levitated object 15 by zero power control on the basis of the aforementioned four movement modes, constant voltage generators 42 and small-capacity power supplies 43 for supplying electric power to these devices are mounted, as four divided units, on the upper surface of the container 37.

Further, a vertical wheel 45a and a horizontal wheel 45b are attached to each of the four corners of the base 25. The four vertical wheels 45a come into contact with the inner surfaces of upper and lower wall portions of the emergency guide rails 14a and 14b, e.g. when magnetic force of the magnetic support units 31a to 31d is lost, thereby vertically supporting the levitated object 15. The horizontal wheels 45b come into contact with the inner surfaces of the side wall portions of the emergency guide rails 14a and 14b and support the levitated object 15 horizontally, thereby preventing the levitated object 15 from running off the guide rails 12a and 12b owing to an excessive horizontal external force.

The base 25 serves also as a secondary conductor plate which is a movable element of the aforementioned linear induction motor, and the base 25 is situated at such a height that it faces the stator 16 with a small gap during operation.

Figure 4:
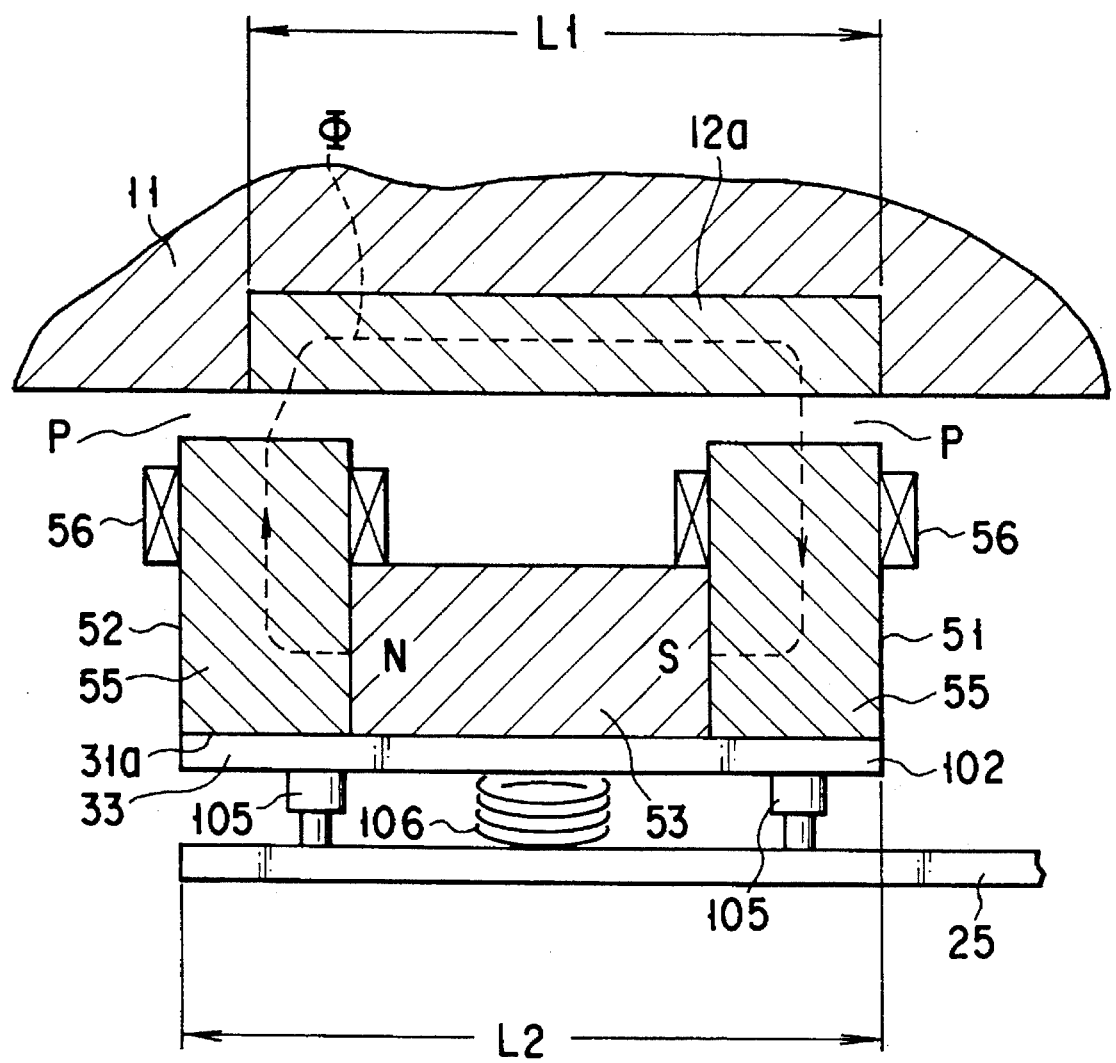
FIG. 4 is a vertical cross-sectional view of a magnetic support unit in the magnetic levitating apparatus.

As is shown in FIG. 4, each of the magnetic support units 31a to 31d comprises two electromagnets 51 and 52 situated to face each other such that upper end portions of the electromagnets 51 and 52 are displaced outwards with respect to the guide rails 12a (12b), and a permanent magnet 53 interposed between side faces of the lower parts of the electromagnets 51 and 52. The electromagnets 51 and 52 and permanent magnet 53 are arranged in a U-shape. Each electromagnet 51, 52 comprises a ferromagnetic yoke 55 and a coil 56 wound around the yoke 55.

The coils 56 are connected in series in such a direction that the magnetic fluxes produced by the electromagnets 51 and 52 are combined. The width $L_1$ of each of guide rails 12a and 12b is less than the width $L_2$ of each of the magnetic support units 31a to 31d.

The gap-variable mechanisms 101 comprise, respectively, L-shaped base seats 102 to which the magnetic support units 31a to 31d are attached, back plates 103 fixed to the four corners on the upper surface of the base 25, four rod members 104 constituting parallel link mechanisms by rotatably coupling the base seats 102 and side faces of the back plates 103 by means of pins, two oil dampers 105 fixed to the lower surfaces of the base seats 102 and the upper surface of the base 25, and coil springs 106 interposed between the two oil dampers 105 between the lower surfaces of the base seats 102 and the upper surface of the base 25.

An inverse number k of a variation amount, per unit weight, of the gap due to the spring force of the coil spring 106, when the base 25 is fixed and a load is applied to the magnet unit, is greater than an absolute value of a value obtained by differentiating the attraction in the direction of gap variation of the magnet unit by the gap length at the time when the excitation current to the electromagnet is zero and a maximum load is placed on the levitated object.

Figure 5:
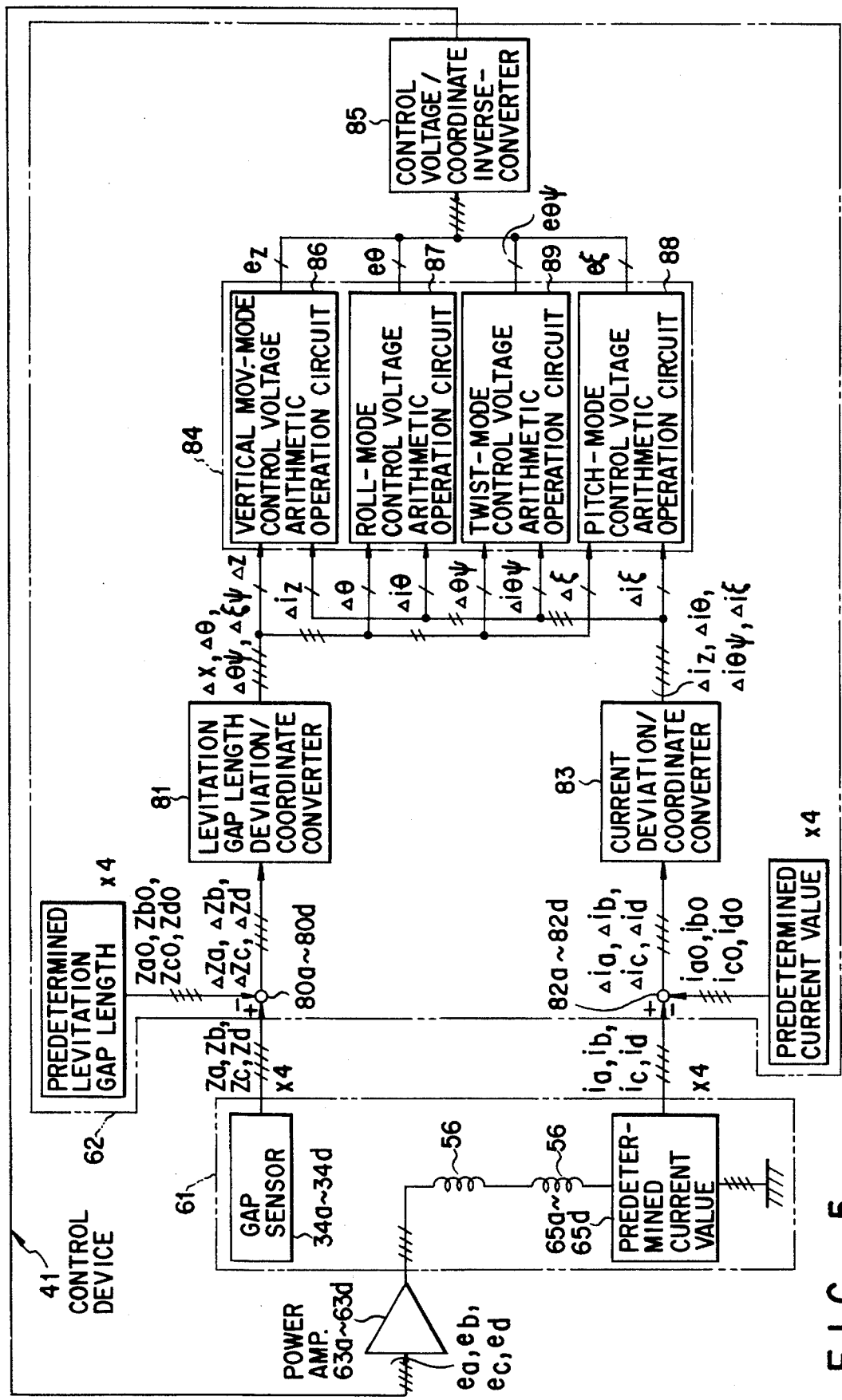
FIG. 5 is a block diagram of a control apparatus in the magnetic levitating apparatus.

Although the control devices 41 are separated, as shown in FIG. 1, these devices 41 constitute a single unit, as shown in, e.g. FIG. 5. In block diagrams to be referred to in the following description, arrow lines indicate signal lines, and solid lines indicate power lines near coils 56. The control device 41 comprises a sensor unit 61, an arithmetic operation circuit 62, and power amplifiers 63a to 63d, and these elements control the attraction forces of the four magnetic support units 31a to 31d. The sensor unit 61 is attached to the levitated object 15 and senses a magnetomotive force or a magnetic resistance in a magnetic circuit formed by the magnetic support units 31a to 31d or a variation in motion of the levitated object 15. The arithmetic operation circuit 62 calculates an electric power to be supplied to each coil 56 on the basis of the signal from the sensor unit 61. The power amplifiers 63a to 63d supply power to the coils 56 on the basis of signals from the arithmetic operation circuit 62.

The power supply 43 supplies power to the power amplifiers 63a to 63d and simultaneously to the constant voltage generator 42 for supplying power to the arithmetic operation circuit 62 and gap sensors 34a to 34d at a constant voltage.

The constant voltage generator 42 supplies power to the arithmetic operation circuit 62 and gap sensors 34a to 34d at a constant voltage, even when the voltage of the power supply 43 varies owing to supply of large current to the power amplifiers 63a to 63d. Thus, the gap sensors 34a to 34d and arithmetic operation circuit 62 always operate normally.

The sensor unit 61 comprises the gap sensors 34a to 34d and current detectors 65a to 65d for detecting current values of the coils 56.

The arithmetic operation circuit 62 performs magnetic levitation control of the levitated object 15 with respect to each movement coordinate shown in FIG. 1. The magnetic levitation control system relating to z-coordinate of the center of gravity of the levitated object 15 is referred to as "z-mode", the magnetic levitation control system relating to the roll (θ-direction) of the levitated object 15 is referred to as "θ-mode", the magnetic levitation control system relating to the pitch (ξ-direction) of the levitated object 15 is referred to as "ξ-mode", and the magnetic levitation control system relating to the distortional movement (θφ-direction) of the plane defined by tip ends of the magnetic support units 31a to 31d is referred to as "θφ-mode".

Specifically, the arithmetic operation circuit 62 comprises subtracters 80a to 80d, a levitation gap length deviation/coordinate converter 81, subtracters 82a to 82d, a current deviation/coordinate converter 83, a control voltage arithmetic operation circuit 84, and a control voltage/coordinate inverse-converter 85. The subtracters 80a to 80d calculate gap length deviation signals $\Delta z_a$ to $\Delta z_d$ by subtracting predetermined gap length values $\Delta z_{a0}$ to $z_{d0}$ from gap length signals $z_a$ to $z_d$ obtained by the gap sensors 34a to 34d. The levitation gap length deviation/coordinate converter 81 calculate the deviations $\Delta z$, $\Delta \theta$, $\Delta \xi$ and $\Delta \theta_\phi$ of z, $\theta$, $\xi$ and $\theta_\phi$ in formula (1) from the gap length deviation signals $\Delta z_a$ to $\Delta z_d$. The subtracters 82a to 82d calculate current deviation signals $\Delta i_a$ to $\Delta i_d$ which are obtained by subtracting predetermined current values $i_{a0}$ to $i_{d0}$ from excitation current detection signals $i_a$ to $i_d$ obtained by the current detectors 65a to 65d. The current deviation/coordinate converter 83 calculates deviations of $\Delta i_z$, $\Delta i_{74}$, $\Delta i_{86}$ and $\Delta i_{\theta\xi}$ of $i_z$, $i_\theta$, $i_\xi$ and $i_{\theta\phi}$ in formula (2) from current deviation signals $\Delta i_a$ to $\Delta i_d$. The control voltage arithmetic operation circuit 84 calculates respective-mode electromagnet control voltages $e_z$, $e_\theta$, $e_\xi$ and $e_{\theta\phi}$ for magnetically levitating the levitated object 15 stably in the respective modes of z, $\theta$, $\xi$ and $\theta_\phi$ by introducing outputs $\Delta z$, $\Delta \theta$, $\Delta \xi$, $\Delta \theta_\phi$, $\Delta i_z$, $\Delta i_{\theta, \Delta i\xi}$ and $\Delta i_{\theta\phi}$ of the levitation gap length deviation/coordinate converter 81 and current deviation/coordinate converter 83. The control voltage coordinate inverse-converter 85 calculates electromagnet excitation voltages $e_a$ to $e_d$ of the magnetic support units 31a to 31d on the basis of formula (9) from the outputs $e_z$, $e_\theta$, $e_\xi$ and $e_{\theta\phi}$ of the control voltage arithmetic operation circuit 84. The results of arithmetic operation of the control voltage coordinate inverse-converter 85, i.e. $e_a$ to $e_d$, are supplied to the power amplifiers 63a to 63d and excitation currents produced by voltages $e_a$ to $e_d$ are supplied to the coils 56.

The control voltage arithmetic operation circuit 84 comprises a vertical movement-mode control voltage arithmetic operation circuit 86 for calculating a z-mode electromagnet control voltage $e_z$ from $\Delta z$ and $\Delta i_z$, a roll-mode control voltage arithmetic operation circuit 87 for calculating a $\theta$-mode electromagnet control voltage $e\theta$ from $\Delta \theta$ and $\Delta i\theta$, a pitch-mode control voltage arithmetic operation circuit 88 for calculating a $\xi$-mode electromagnet control voltage $e\xi$ from $\Delta \xi$ and $\Delta i\xi$, and a twist-mode control voltage arithmetic operation circuit 89 for calculating a $\theta\phi$-mode electromagnet control voltage $e\theta\phi$ from $\Delta \theta\phi$ and $\Delta i\theta\phi$.

Figure 6:
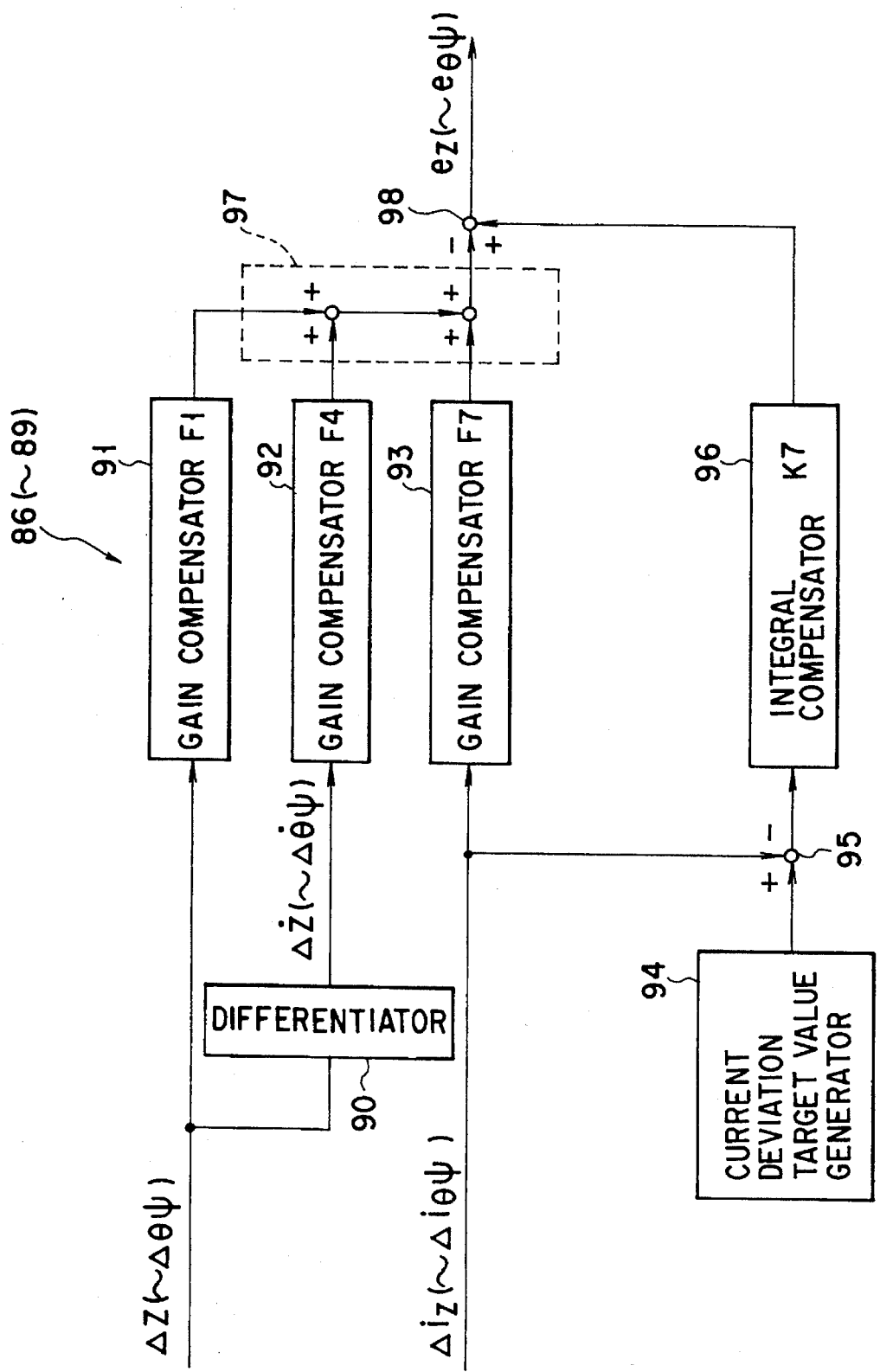
FIG. 6 is a block diagram showing the structure of a control voltage arithmetic operation circuit in the control apparatus shown in FIG. 5.

The vertical movement-mode control voltage arithmetic operation circuit 86, roll-mode control voltage arithmetic operation circuit 87, pitch-mode control voltage arithmetic operation circuit 88 and twist-mode control voltage arithmetic operation circuit 89 are constituted by the same structural elements, as shown in FIG. 6. The structure of the control voltage arithmetic operation circuit 84 will now be described by describing the vertical movement-mode control voltage arithmetic operation circuit 86 by way of example.

Specifically, the vertical movement-mode control voltage arithmetic operation circuit 86 comprises a differentiator 90 for receiving $\Delta z$ and calculating a time-differential value $\Delta z'$ of $\Delta z$ (in this description a mark "'" is used in place of "." indicating time differentiation, a gain compensator 91 for receiving $\Delta z$ and multiplying feedback gain $F_{1z}$ by $\Delta z$, a gain compensator 92 for receiving $\Delta z$ and multiplying feedback gain $F_{4z}$ by $\Delta z$, a gain compensator 93 for receiving $\Delta iz$ and multiplying feedback gain $F_{7z}$ by $\Delta iz$, a current deviation target value generator 94, a subtracter 95 for subtracting $\Delta i_z$ from a target value of the current deviation target value generator 94, an integral compensator 96 for integrating an output value of the subtracter 95 and multiplying the feedback gain $K_{7z}$, shown in FIG. 7, by the integrated result, a summer 97 for receiving outputs of the gain compensators 91, 92 and 93 and summing them, and a subtracter 98 for subtracting an output of the summer 97 from the output of the integral compensator 96. The subtracter 98 outputs an output signal $e_z$. Thus, the vertical movement-mode control voltage arithmetic operation circuit 86 achieves the z-mode control illustrated in FIG. 7. Needless to say, the gain $K_{7z}$ of the integral compensator 96 takes a negative value.

The twist-mode control voltage arithmetic operation circuit 89 comprises the same structural elements as the vertical movement-mode control voltage arithmetic operation circuit 86. Needless to say, in order to achieve the $\theta\phi$-mode control shown in FIG. 7, the gain $K_{7\theta\phi}$ of the integral compensator 96 takes a positive value.

The operation of the magnetic levitating apparatus according to the above-described embodiment will now be described.

When the apparatus is in the halt state, the vertical wheels 45a of the levitated object 15 are in contact with the inner surfaces of either the upper or lower wall portions of the emergency guide rails 13a and 13. When the apparatus is activated in this state, the control devices 41 cause the electromagnets 51 and 52 to produce magnetic fluxes in the same direction as or opposite direction to the magnetic fluxes produced by the permanent magnets 53, and also control the currents to the excitation coils 56 so as to maintain the gap lengths between the magnetic support units 31a to 31d and the guide rails 12a and 12b at constant values. Thereby, as shown in FIG. 4 which representatively illustrates the magnetic support unit 31a, a magnetic circuit is produced by the permanent magnet 53, yoke 55, gap P, guide rail 12a, gap P, yoke 55 and permanent magnet 53.

The gap length of the gap P is set such that the magnetic attraction of the magnetic support units 31a to 31d due to the excitation force of the permanent magnets 53 acting on the guide rails 12a and 12b is kept at a predetermined total amount. The predetermined total amount is the sum of the torque about x-axis passing through the center of gravity of the levitated object 15, caused by the entire weight, load, etc. of the levitated object 15 including the load, the torque about x-axis, the spring force of the gap-variable mechanism 101, and the weight of the magnetic support units 31a to 31d.

The control devices 41 perform excitation current control for the electromagnets 51 and 52 of the magnetic support units 31a to 31d so as to maintain the gap lengths. At this time, the spring constant k of the gap-variable mechanism 101 is set to be greater than the absolute value of a value obtained by differentiating, based on the gap length, the magnetic attraction of the magnetic support units 31a to 31d due to the excitation force of the permanent magnets 53 when the maximum load is placed on the levitated object 15, i.e. the absolute value of the inclination of a tangent shown in FIG. 8. or the magnetic spring constant. Thereby, so-called "zero power control" is effected.

When the stator 16 is energized when the levitated object 15 is situated just below the stator 16 of the linear induction motor, the base 25 receives a thrust force from the stator 16. As a result, the levitated object 15 starts to run along the guide rails 12a and 12b in a magnetically levitated state. If another stator 16 is situated within a distance over which the levitated object 15 can move and is not completely stopped owing to air resistance, etc., the levitated object 15 can receive the thrust force once again. Accordingly, the object 15 continues to move along the guide rails 12a and 12b.

Thus, the levitated object 15 can be moved to a target point in a non-contact state.

When the levitated object 15 is removed from the end of the track frame 11 for the purpose of maintenance or inspection, the spring constant k of the gap-variable mechanism 101 is greater than the magnetic spring constant of the magnetic support units 31a to 31d. Thus, even if the object 15 is removed by holding the parts below the gap-variable mechanism 101, e.g. the coupling members 35a, 35b, 36a and 36b or container 37, the magnetic support units 31a to 31d do not collide with the guide rails or are not attracted by the attraction acting on the guide rails 12a and 12b. Therefore, the apparatus is not damaged and the levitated object 15 can easily be handled. As a result, the maintainability of the magnetic levitating apparatus can be remarkably enhanced.

In the above embodiment, the levitated object 15 comprises the four magnetic support units and gap-variable mechanisms. However, there are no limitations to the number of magnetic support units, the use of gap-variable mechanisms, or to the structure of the control devices relating to these elements, and various modifications can be made.

Figure 9:
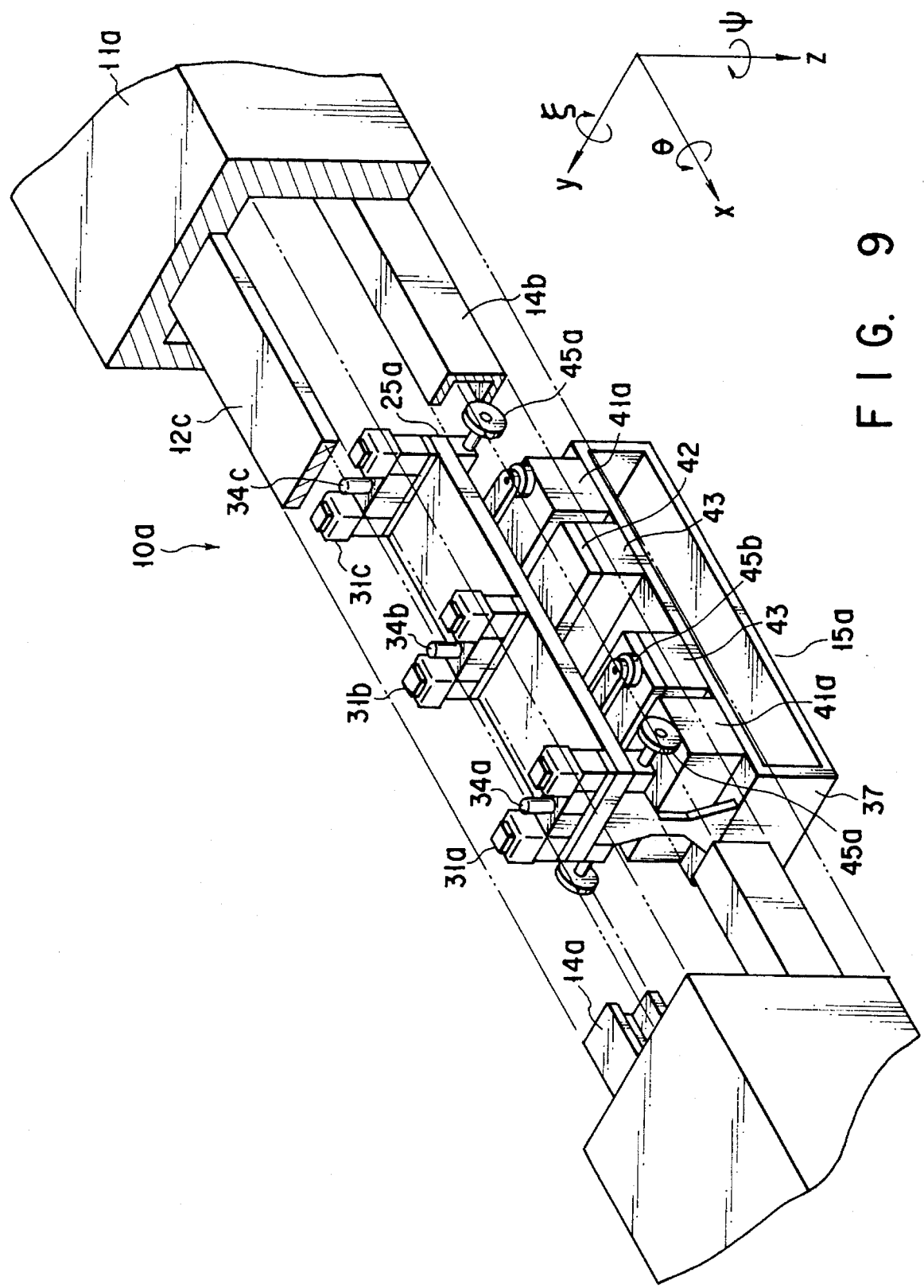
FIG. 9 is a perspective view of an important portion of a magnetic levitating apparatus according to another embodiment of the present invention.

For example, as is shown in FIG. 9, a magnetic support device 10a may be constituted by a levitated object 15a comprising three magnetic support units facing a single guide rail 12c.

In this magnetic support device 10a, the levitated object 15a is supplied with a thrust force by exciting a stator 16 (not shown) situated at such a height as to face the lower surface of a container 37 with a small gap, the container 37 serving as a secondary conductor plate of a linear induction motor and being situated along the track frame 11a with a predetermined distance. For the purpose of brevity, the same structural elements as shown in FIG. 1 are denoted by like reference numerals with additional characters, and a description thereof is omitted.

Figure 10:
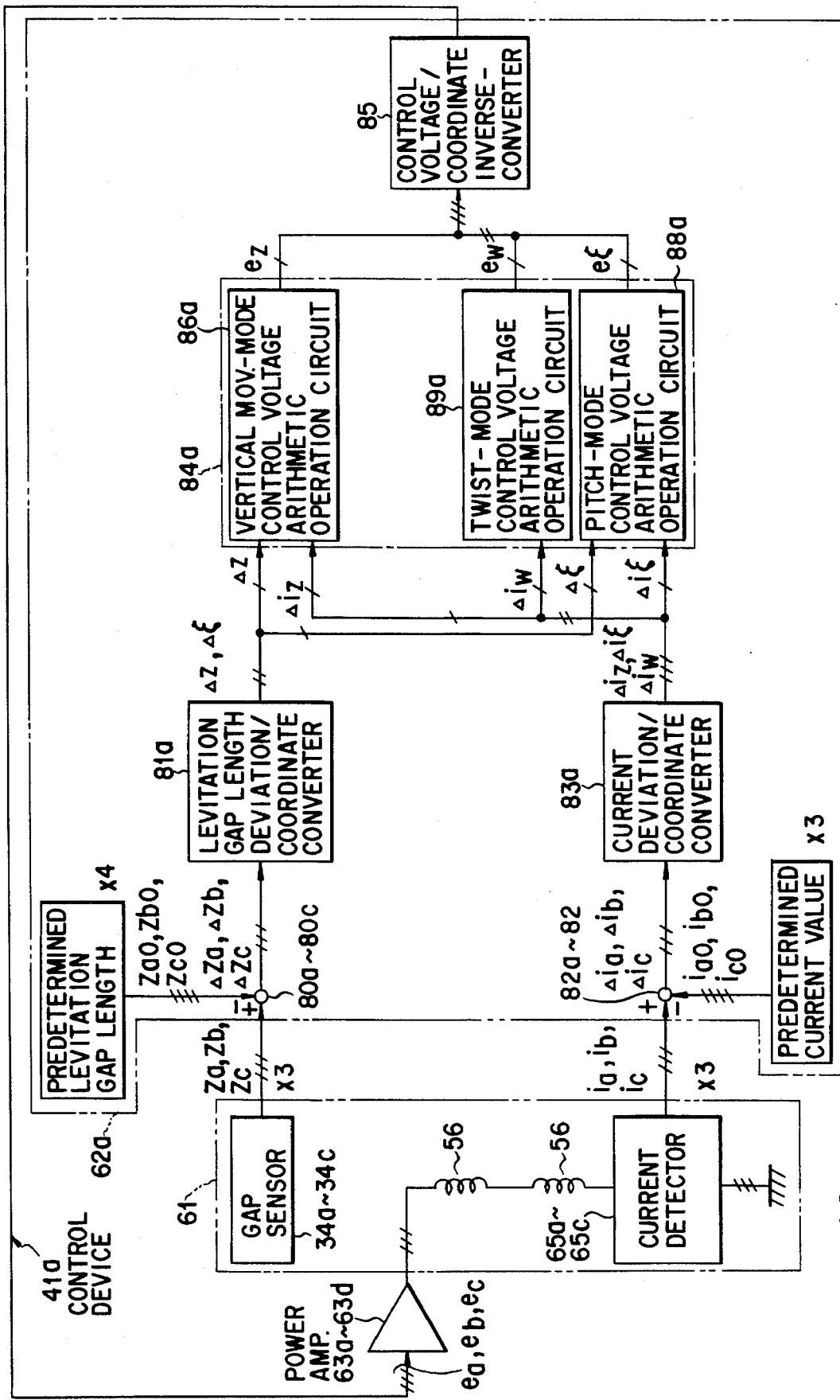
FIG. 10 is a block diagram showing the structure of a control apparatus in this apparatus.

Magnetic support units 31a to 31c are attached directly to a base 25a with high rigidity of the levitated object 15a. The control device 41 is constructed, as shown in FIG. 10.

An arithmetic operation circuit 62a performs z-and ξ-mode zero power control of the levitated object 15a and also performs a w-mode zero power control for reducing to zero a difference $i_w$ obtained by subtracting an excitation current $i_b$ of the magnetic support unit 31b from an excitation current $i_a$ of the magnetic support unit 31a.

Specifically, the arithmetic operation circuit 62a comprises subtracters 80a to 80c, a levitation gap length deviation/coordinate converter 81, subtracters 82a to 82c, a current deviation/coordinate converter 83a, a control voltage arithmetic operation circuit 84a, and a control voltage/coordinate inverse-converter 85a.

The subtracters 80a to 80c calculate gap length deviation signals $\Delta z_a$ to $\Delta z_c$ by subtracting predetermined gap length values $z_{a0}$ to $z_{c0}$ from gap length signals $z_a$ to $z_c$ obtained by the gap sensors 34a to 34c. The levitation gap length deviation/coordinate converter 81a calculate the deviations $\Delta z$ and $\Delta \xi$ of z and ξ from the gap length deviation signals $\Delta z_a$ to $\Delta z_c$ on the basis of formula (18).

$$\begin{cases} 3\Delta z = (\Delta Z_a + \Delta z_b + z_c) \\ q\xi \Delta \xi = \Delta z_2 - \Delta z_c \end{cases} \quad (18)$$

The subtracters 82a to 82c calculate current deviation signals $\Delta i_a$ to $\Delta i_c$ which are obtained by subtracting predetermined current values $i_{a0}$ to $i_{c0}$ from excitation current detection signals $i_a$ to $i_c$ obtained by the current detectors 65a to 65c. The current deviation/coordinate converter 83a calculates deviations of $\Delta i_z$, $\Delta i_\xi$ and $\Delta i_w$ of $i_z$, $i_\xi$ and $i_w$ from current deviation signals $\Delta i_a$ to $\Delta i_c$ on the basis of formula (19).

$$\begin{cases} 3\Delta i_z = (\Delta i_a + \Delta i_b + \Delta i_c) \\ q\xi \Delta i\xi = \Delta i_a - \Delta i_c \\ \Delta i_w = \Delta i_a - \Delta i_b \end{cases} \quad (19)$$

The control voltage arithmetic operation circuit 84a calculates respective-mode electromagnet control voltages $e_z$, $e_\xi$ and $e_w$ for magnetically levitating the levitated object 15 stably in the respective modes of z, ξ and w by introducing outputs $\Delta z$, $\Delta \xi$, $\Delta i_z$, $\Delta i_\xi$ and $\Delta i_w$ of the levitation gap length deviation/coordinate converter 81a and current deviation/coordinate converter 83a. The control voltage coordinate inverse-converter 85a calculates electromagnet excitation voltages $e_a$ to $e_c$ of the magnetic support units 31a to 31c on the basis of formula (20) from the outputs $e_z$, $e_\xi$ and $e_w$ of the control voltage arithmetic operation circuit 84a.

$$\begin{cases} e_a = e_z + \dfrac{q\xi}{3} e_\xi + \dfrac{1}{3} e_w \\ e_b = e_z + \dfrac{q\xi}{3} e_\xi - \dfrac{2}{3} e_w \\ e_c = e_z - \dfrac{2q\xi}{3} e_\xi + \dfrac{1}{3} e_w \end{cases} \quad (20)$$

The results of arithmetic operation of the control voltage coordinate inverse-converter 85a, i.e. $e_a$ to $e_c$, are supplied to the power amplifiers 63a to 63c and excitation currents produced by voltages $e_a$ to $e_c$ are supplied to the coils 56.

The control voltage arithmetic operation circuit 84a comprises a vertical movement-mode control voltage arithmetic operation circuit 86a for calculating a z-mode electromagnet control voltage $e_z$ from $\Delta z$ and $\Delta i_z$, a pitch-mode control voltage arithmetic operation circuit 88a for calculating a ξ-mode electromagnet control voltage $e\xi$ from $\Delta \xi$ and $\Delta i\xi$, and a twist-mode control voltage arithmetic operation circuit 89a for calculating a w-mode electromagnet control voltage $e_w$ from $\Delta iw$.

The vertical movement-mode control voltage arithmetic operation circuit 86a constitutes a zero power control loop in which an average value $u_z$ of z-axis external force applied to the magnet units 31a to 31c is estimated by, e.g. a state observer, and this average value is multiplied by a predetermined gain, and the result is fed back to the electromagnet excitation voltage $e_z$. The pitch-mode control voltage arithmetic operation circuit 88a constitutes a zero power control loop in which $\Delta \xi$ and $\Delta i\xi$ are multiplied by predetermined gains which are not zero at the same time and then input to a filter having a first-order transmission function, and the output of the filter is fed back to the electromagnet excitation voltage $e\xi$. In addition, the twist-mode control voltage arithmetic operation circuit 89a constitutes a zero power control loop in which $\Delta iw$ is input to an integral compensator having a predetermined gain and the output of the integral compensator is fed back to the electromagnet excitation voltage $e_w$.

Specifically, the vertical mov.-mode control voltage arithmetic operation circuit 86a comprises, as shown in FIG. 11, a vertical mov.-mode state observer 201 for receiving $\Delta z$ and $\Delta iz$ and calculating and outputting $\Delta z$, $\Delta z'''$, $\Delta iz$ and $uz''$ (in this description mark (") is used for a "hat" mark indicating estimation), a gain compensator 91 for receiving $\Delta z$ and multiplying Δz by feedback gain $F_{1z}$, a gain compensator 92 for receiving Δz and multiplying Δz by feedback gain $F_{4z}$, a gain compensator 93 for multiplying Δiz by feedback gain $F_{7z}$, a gain compensator 203 for multiplying $u_z$ by feedback gain $F_{8z}$, a summer 97a for calculating a sum of the outputs from the gain compensators 91, 92, 93 and 203, and a subtracter 98 for subtracting the output of the summer 97a from an output from a target value generator 94a. The subtracter 98 outputs a signal $e_z$. Thus, the vertical mov.-mode control voltage arithmetic operation circuit 86a achieves the control illustrated in FIG. 12. In FIG. 12, $\alpha_{11}$ and $\alpha_{21}$ are constants which can be freely determined so that characteristic roots are located on the left half of a complex plane when $\det[sI-A"]=0$.

$$A = \begin{pmatrix} 0 & 1 & 0 \\ a_{41} & 0 & a_{47} \\ 0 & a_{74} & a_{77} \end{pmatrix}, \quad B = \begin{pmatrix} 0 \\ 0 \\ b_{71} \end{pmatrix}, \quad C = \begin{pmatrix} 1 & 0 & 0 \\ 0 & 0 & 1 \end{pmatrix}$$

$$D = \begin{pmatrix} 0 \\ d_{41} \\ 0 \end{pmatrix}, \quad A = \begin{pmatrix} -\alpha_{11} & d_{41} \\ -\alpha_{21} & 0 \end{pmatrix}$$

$$B = \begin{pmatrix} a_{41} + d_{41}\alpha_{21} - \alpha_{11} & a_{47} \\ -\alpha_{11}\alpha_{21} & 0 \end{pmatrix}$$

$$C = \begin{pmatrix} 0 & 0 \\ 1 & 0 \\ 0 & 0 \\ 0 & 1 \end{pmatrix}, \quad D = \begin{pmatrix} 0 & 0 \\ \alpha_{11} & 0 \\ 0 & 1 \\ \alpha_{21} & 0 \end{pmatrix}$$

$$X = (\Delta z \; \Delta \cdot z \; \Delta i_z)^T, \quad \hat{X} = (\Delta z \; \Delta \cdot z \; \Delta i_z \hat{u}_z)^T,$$

$$F + (F_{1z} \; F_{4z} \; F_{7z} \; F_{8z})$$

The z-mode zero power control, as described above, is publicly known, as disclosed in, e.g. Japanese Patent Application No. 60-146033, and a detailed description thereof is omitted. In this case, $u_z"$ is input and multiplied by gain $F_{8z}$, and an output is obtained by the subtracter 98. Thus, the zero power control loop is constituted. Since $F_{8z}=(d_{41}/a_{41})$, $F_{8z}$, like $F_{1z}$, is less than zero ($F_{8z}<0$). Accordingly, needless to say, if input $u_z"$ is positive (negative), output $e_z$ is positive (negative).

Figure 13:
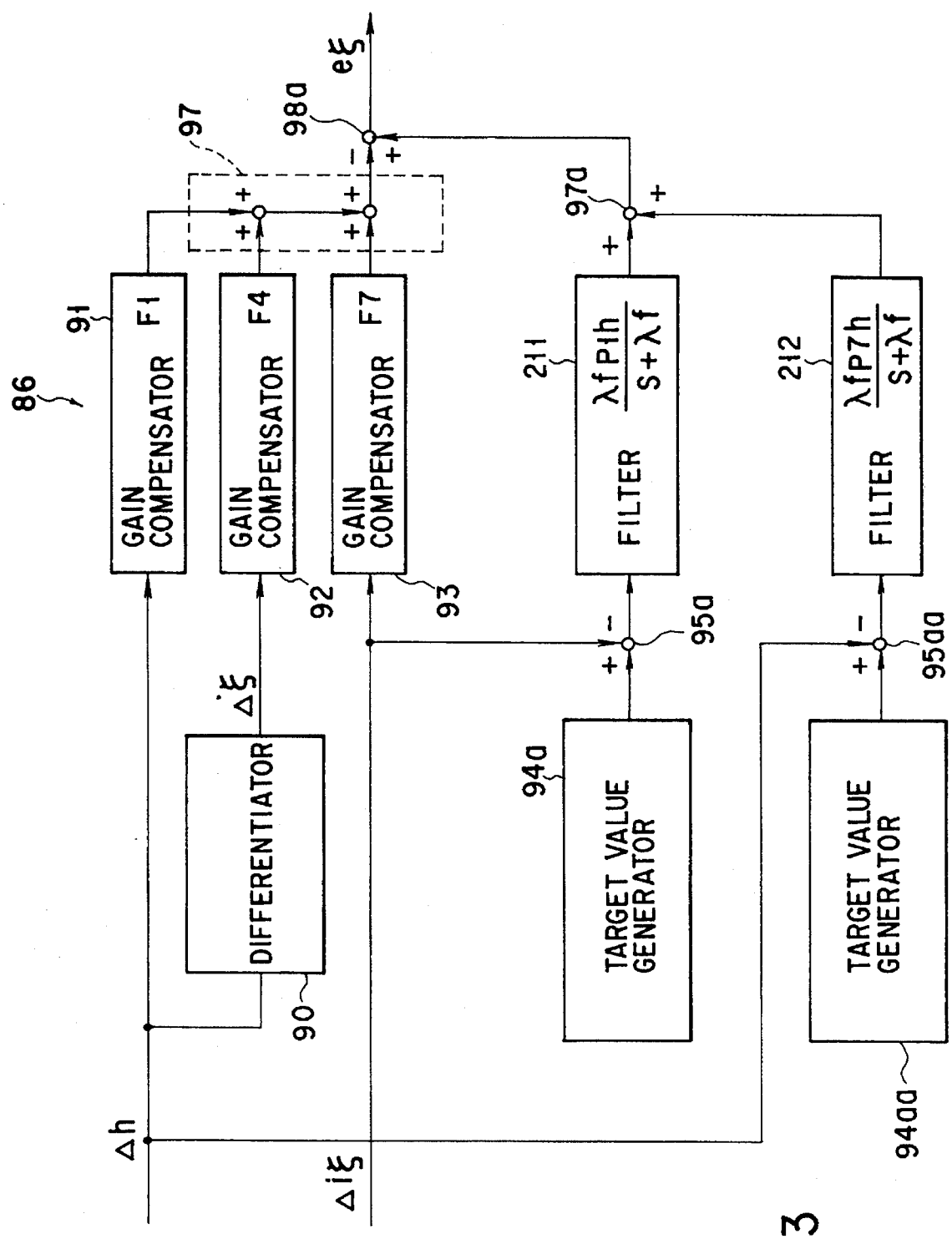
FIG. 13 is a block diagram showing the structure of a pitch mode control voltage arithmetic operation circuit in the control apparatus.

The pitch-mode control voltage arithmetic operation circuit 88a comprises, as shown in FIG. 13, a differentiator 90 for receiving Δξ and calculating and outputting a time differentiation value Δξ' of Δξ, a gain compensator 91 for receiving Δξ and multiplying &$&N by feedback gain $F_{1\xi}$, a gain compensator 92 for receiving Δξ and multiplying Δξ by feedback gain $F_{4\xi}$, a gain compensator 93 for receiving Δiξ and multiplying Δiξ by feedback gain $F_{7\xi}$, a target value generator 94a, a subtracter 95a for subtracting Δξ from a target value of the target value generator 94a, a filter 211 having a first-order transmission function of characteristic root -λf and gain P1ξ and receiving an output value of the subtracter 95a, a target value generator 94aa, a subtracter 95aa for subtracting Δiξ from the target value of the target value generator 94aa, a filter 212 having a first-order transmission function of characteristic root -λf and gain P7ξ and receiving an output value of the subtracter 95aa, a summer 97 for calculating a sum of outputs from the gain compensators 91 to 93, a summer 97a for calculating a sum of outputs from the filters 211 and 212, and a subtracter 98a for subtracting the output value of the summer 97 from the output value of the summer 97a.

The output signal from the subtracter 98a is eξ. Thus, the pitch-mode control voltage arithmetic operation circuit 88a achieves the ξ-mode control as illustrated in FIG. 14. In FIG. 14, the following relationship exists:

$$P=(P_{1\xi}0P_{7\xi}), T_f=1/\lambda_f$$

$$P_{1H}=-F_{1\xi}'P_{7\xi}=F_{7\xi}\lambda f<0$$

If the inputs to the filters 211 and 212 from the subtracters 95a and 95aa are positive step inputs, eξ>0. Needless to say, a zero power loop is constituted such that the output values from the subtracters 95a and 95aa are supplied to the subtracter 98a via the filters 211 and 212 and the output from the subtracter 98a is obtained.

The twist-mode control voltage arithmetic operation circuit 89a comprises, as shown in FIG. 15, a gain compensator 93 for receiving Δiw and multiplying Δiw by feedback gain $F_{7w}$, a current deviation target value generator 94, a subtracter 95 for subtracting Δiw from a target value of the current deviation target value generator 94, an integral compensator 96 for integrating the output of the subtracter 95 and multiplying the integration result by feedback gain $K_{7w}$, shown in FIG. 7, and a subtracter 98a for subtracting the output of the gain compensator 93 from the output value of the integral compensator 96. The output signal from the subtracter 98a is $e_w$. Thus, the twist-mode control voltage arithmetic operation circuit 89a achieves the control corresponding to $F=(0 \; 0 \; F_{7w})$, $K=(0 \; 0 \; K_{7w})$ as regards feedback gains F and K in the θφ-mode in FIG. 7. Needless to say, the gain $K_{7w}$ of the integral compensator 96 takes a positive gain.

In the above embodiment, the direction for guiding the levitated object is not controlled, but there is no limitation to the presence/absence of control of the direction for guiding. For example, an apparatus as shown in FIG. 16 may be adopted.

In this apparatus, the levitated object 15 of the magnetic levitating apparatus according to the embodiment shown in FIG. 1 is modified such that magnetic support units 31a to 31d are directly attached to a high-rigidity base 25 without interposing the gap-variable mechanisms 101, thus constituting a levitated object 15. In this magnetic levitating apparatus 10b, control devices 41b having structures similar to those of the control devices disclosed in the present inventors' previous Japanese Patent Application No. 1-53165. FIG. 17 shows the structure of the control device 41b.

In the control device 41b, the vertical mov.-mode control voltage arithmetic operation circuit 221, roll & lateral mov.-mode control voltage arithmetic operation circuit 223 and pitch-mode control voltage arithmetic operation circuit 225 have structures similar to those of the corresponding circuits in Japanese Patent Application No. 1-53165. Since the base 25 of the levitated object 15b has high rigidity, the structure of a yaw-mode control voltage arithmetic operation circuit 227 differs from that of the yaw-mode control voltage arithmetic operation circuit of Application No. 1-53165.

Supposing that the center of gravity of the levitated object 15b lies at the center of the levitated object 15b, movement formulae of movement of the levitated object 15b and voltage formulae of excitation voltage applied to the electromagnets of magnetic support units 31a to 31d are linearized in the substantially normal levitation state on the basis of a coordinate system shown in FIG. 16 and expressed in four modes: vertical movement of the center of gravity (z-direction), rolling around the center of gravity (θ-direction), pitching around the center of gravity (ξ-direction), and yawing movement around the center of gravity (φ-direction). Linearized differential equations of the z-mode, θ-mode and ξ-mode are the same as those of the z-mode, θy-mode and ξ-mode in Japanese Patent Application No. 1-53165. If formulae (21) and (22) are subjected to coordinate conversion with respect to the respective modes, when $I\phi$ is the inertia moment of levitated object 15 about z-axis, y is the deviation of magnet units 31a to 31d in y-axis from the normal levitated state and $T\phi$ is the torque disturbance about z-axis applied to the levitated object 15b, formula (23) with respect to the φ-mode is given:

$$4\Delta z = \Delta z_a + \Delta z_b + \Delta z_c + \Delta z_d \quad (21)$$
$$q_\theta \Delta\theta = \Delta z_a - \Delta z_b - \Delta z_c + \Delta z_d$$
$$2q_\xi \Delta\xi = -\Delta z_a - \Delta z_b + \Delta z_c + \Delta z_d$$
$$2q_\xi \Delta\phi = \Delta y_a + \Delta y_b - \Delta y_c - \Delta y_d$$
$$4\Delta i_z = \Delta i_a + \Delta i_b + \Delta i_c + \Delta i_d \quad (22)$$
$$q_\theta \Delta i_\theta = \Delta i_a - \Delta i_b - \Delta i_c + \Delta i_d$$
$$2q_\xi \Delta i_\xi = -\Delta i_a - \Delta i_b + \Delta i_c + \Delta i_d$$
$$q_\theta \Delta i_\phi = \Delta i_a - \Delta i_b + \Delta i_c - \Delta i_d$$

$$I_\psi \Delta \times \times \psi = \frac{\partial F_y}{\partial y} q_\xi^2 \Delta\psi + \frac{1}{2} q_\theta q_\xi \frac{\partial F_y}{\partial i} \Delta i_\psi + T_\psi \quad (23)$$

$$L_{zo} q_\theta \Delta \times i_\psi = -2N \frac{\partial \phi}{\partial y} q_\xi \Delta \times \psi - R q_\theta \Delta i_\psi + q_\theta e_\psi$$

As regards the other three modes, Japanese Patent Application No. 1-53165 should be referred to, and a description thereof is omitted. By coordinate-conversion of formula (21), three signals, $\Delta z$, $\Delta\theta$ and $\Delta\xi$, are output from the levitation gap length deviation/coordinate converter 81b. As regards formula (23), the state vector can be defined as expressed in formula (24):

$$x_3 = (\Delta\phi \Delta\phi' \Delta i_\phi) \quad (24)$$

By this definition, formula (23) can be expressed by formula (7). At this time, if $e\phi$ is a control voltage for stabilizing the φ-mode, $e_3 = e\phi$ in formula (7). The respective control voltages in the magnet units 31a to 31d are given by substituting $e\phi$ for $e\theta\phi$ in formula (9).

As regards the φ-mode, the state observer for estimating $\Delta\phi''$ and $\Delta\phi'''$ from formula (7) by using $\Delta i_\phi$ is constructed, for example, as follows:

$$A = \begin{pmatrix} 0 & 1-\alpha_{11}a_{74} \\ a_{43} - \alpha_{21}a_{74} \end{pmatrix}, \quad B = \begin{pmatrix} \alpha_{21} - \alpha_{11}\alpha_{21}a_{74} - \alpha_{11}a_{77} \\ \alpha_{11}a_{43} + a_{47} - \alpha_{21}^2 a_{74} - \alpha_{21}a_{77} \end{pmatrix}$$

$$C = \begin{pmatrix} 1 & 0 \\ 0 & 1 \\ 0 & 0 \end{pmatrix}, \quad D = \begin{pmatrix} \alpha_{11} \\ \alpha_{21} \\ 1 \end{pmatrix}, \quad E = \begin{pmatrix} -\alpha_{11}b_{71} \\ -\alpha_{21}b_{71} \end{pmatrix}$$

Figure 18:
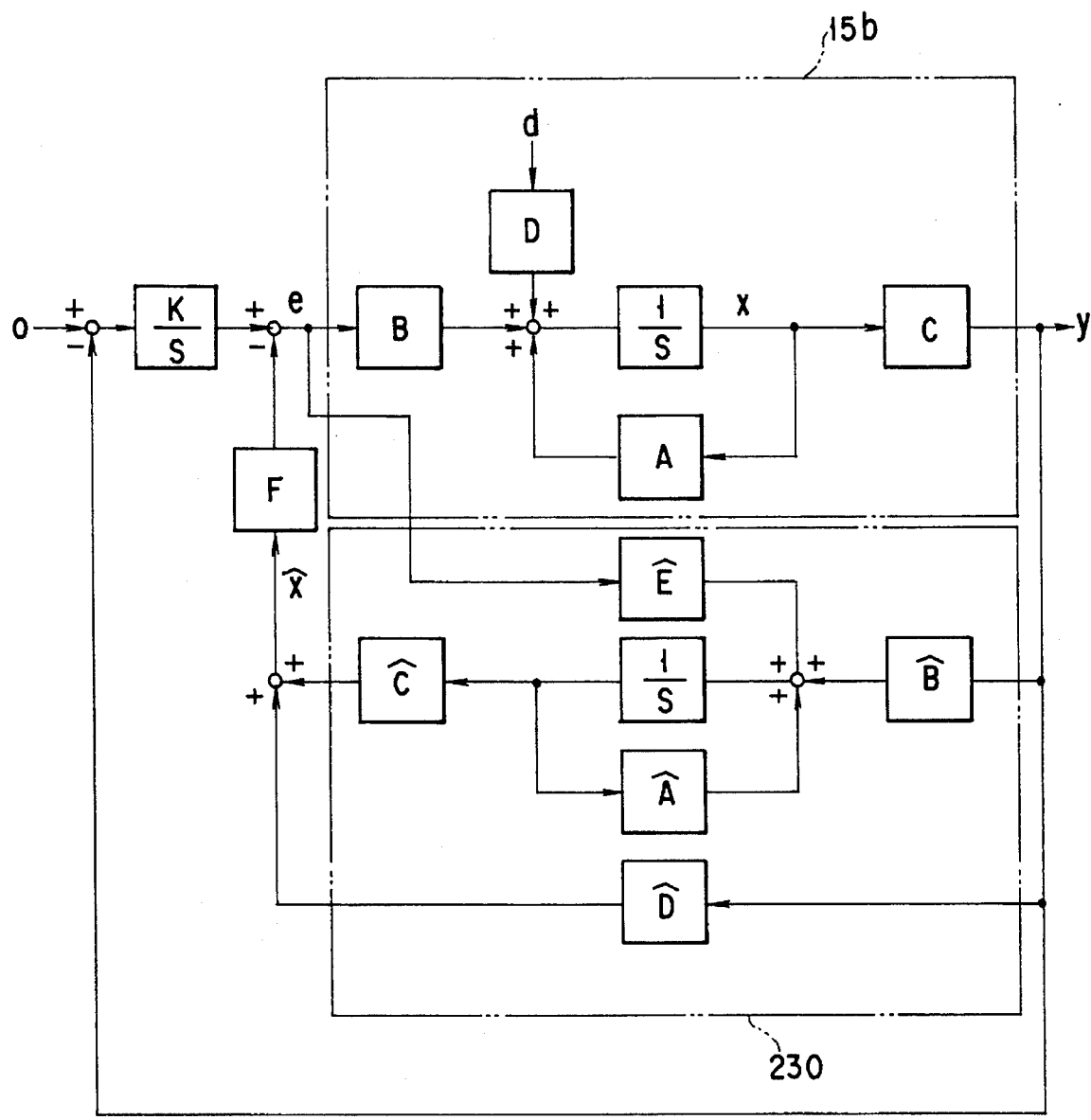
FIG. 18 is a control block diagram showing a yaw mode magnetic levitation control system in the magnetic levitating apparatus.
Figure 22:
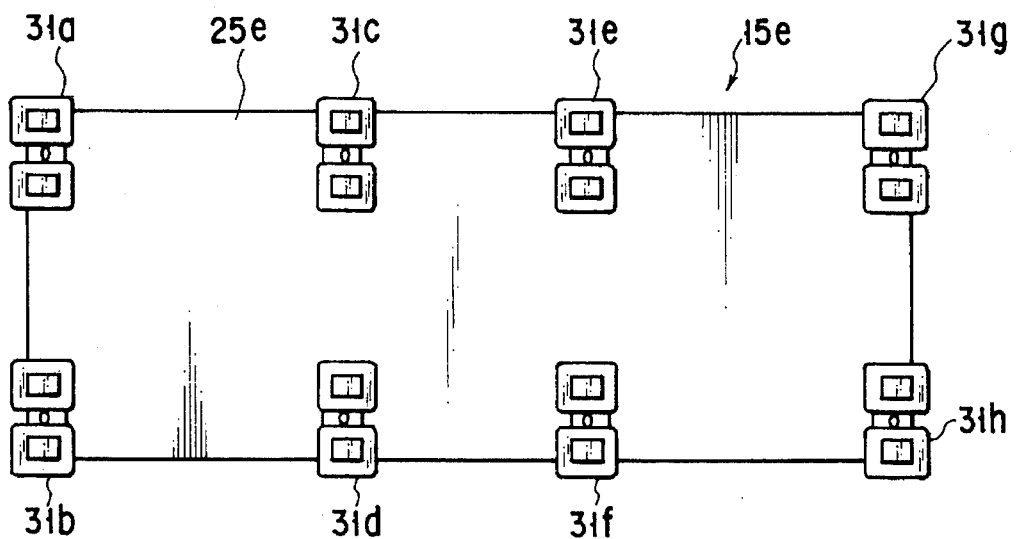
FIG. 22 is a plan view showing a magnetic levitating apparatus according to still another embodiment of the invention.

If $\Delta\phi''$ and $\Delta\phi'''$ estimated as $\Delta i\phi$ are fed back to $e\phi$ via a suitable gain compensator and simultaneously $\Delta i\phi$ is fed back to $e\phi$ via a suitable integral compensator, stabilization of the φ-mode of formula (7) and zero power control can be achieved. Thus, $\Delta i\phi$ is decreased to zero and yawing of the levitated object 15b is quickly attenuated. FIG. 18 is a control block diagram relating to this case.

For stabilization of the system of FIG. 18, it is necessary that a constant term of a multi-term formula of s of the left side of the following characteristic equation of s be a positive value:

$$det[sI-A]det[sI-A+bFI+bKI/s]s=0 \quad (25)$$

In FIG. 18, an output matrix C, a feedback gain compensator F and integral compensator K are defined as follows:

$$c=(0\ 0\ 1),$$
$$F=(F_{3\phi} F_{6\phi} F_{7\phi}),$$
$$K=(K_{7\phi})$$

Since $\alpha_{11}$ and $\alpha_{21}$ are set to stabilize the state observer, the 0-th order term of s of $det[sI-A]$ is a positive value. On the other hand, the 0-th order term of s of the following formula (26) in formula (25) is expressed by formula (27):

$$det[sI - A + bFI + bKI/s]s \quad (26)$$

$$-\frac{q_\xi^2}{i_\psi L_{zo}} \left(\frac{\partial F_y}{\partial y}\right) K_{7\theta\psi} \quad (27)$$

Since the magnetic support units 31a to 31d tend to follow the guide rails 12a and 12b, a formula, $\partial F_y/\partial y < 0$, is always established. Thus, if $$K_{7i} > 0 \quad (28)$$

the constant term of the multi-term formula of s in formula (25) is a positive value.

Since characteristic formulae of the z-mode and ξ-mode, other than the case of the state observer, are similar to formula (26), the 0-th order terms of s of these modes are given by:

$$-\frac{4}{(4m+M)L_{zo}} \left(\frac{\partial F_z}{\partial z}\right) K_{7z} \quad (29)$$

$$-\frac{q_\xi^2}{i_\xi L_{zo}} \left(\frac{\partial F_z}{\partial z}\right) K_{7\xi} \quad (30)$$

Since $\partial F_z/\partial z > 0$, if these modes are stable, $$K_{7i}(i=z,\xi) < 0 \quad (31)$$

In order to achieve the control of FIG. 18, the yaw-mode control voltage arithmetic operation circuit 227 is constructed, as shown in FIG. 19. Specifically, the yaw-mode control voltage arithmetic operation circuit 227 comprises a yaw-mode state observer 230 for receiving $\Delta i\phi$ expressed by formula (22) and the φ-mode electromagnet control voltage $e\phi$, producing estimated values $\Delta\phi''$ and $\Delta\xi$ of yaw angle $\Delta\phi$ and yaw-directional angular velocity $\Delta\phi'$ of the levitated object 15b and outputting $\Delta\xi''$, $\Delta\xi'''$ and $\Delta i \Delta\phi$, a gain compensator 91 for receiving $\Delta\phi''$ and multiplying it by feedback gain $F_{3\phi}$, a gain compensator 92 for receiving $\Delta\phi'''$ and multiplying it by feedback gain $F_{6\phi}$, a gain compensator 93 for receiving $\Delta i\phi$ and multiplying it by feedback gain $F_{7\phi}$, a current deviation target value generator 94, a subtracter 95 for subtracting $\Delta i\xi$ from a target value of the current deviation target value generator 94, an integral compensator 96 for integrating the output of the subtracter 95 and multiplying the result by feedback gain $K_{7\phi}$, a summer 97 for calculating a sum of the outputs of the gain compensators 91 to 93, and a subtracter 98 for subtracting the output value of the summer 97 from the output value of the integral compensator 96. The output signal of the subtracter 98 is e$\phi$. Needless to say, the gain $K_{7\phi}$ of the integral compensator 96 takes a positive value, and the gain $K_{7\phi}$ (i=z, $\xi$) of the integral compensators of the other modes take negative values.

In the above embodiment, in the modes of the levitated object 15 other than the z-mode and $\xi$-mode, the excitation current of the magnetic support unit is fed back to the excitation voltage via the integral compensator in the zero power control. This does not limit the control system of the zero power control loop of the modes other than the z-mode and $\xi$-mode.

For example, the twist-mode control voltage arithmetic operation circuit 88 of the control device 41 may be constructed, as shown in FIG. 11. Where external disturbance is estimated and zero power control is effected, the gain $F_{8i}$ (i=z, $\xi$, $\theta$, $\theta\phi$) of the zero power feedback loop in the $\theta\phi$-mode is given by as follows:

$$F_{8\theta\phi}=(d_{41}/a_{41})F_{10\theta\phi}$$

However, $F_{8\theta\phi}>0$, since $F_{10\phi}<0$, $a_{41}<0$, and $d_{41}>0$. In addition, the twist-mode control voltage arithmetic operation circuit 88 may be constructed, as shown in FIG. 13. In this case, for stabilization of the $\theta\phi$-mode, it is necessary that a constant term, $\lambda_f a_{41} a_{77}$, of a multi-term formula of s of the left side of the characteristic equation (32) be given by equation (33):

$$(s+\lambda_f)det[sI-A+BFC+\lambda_f BPC/(s+\lambda_f)]=0 \tag{32}$$

$$\lambda_f a_{41} a_{77}>0 \tag{33}$$

In formula (31), since $a_{41}<0$, and $d_{77}<0$, $\lambda_f$ must be given by formula (34):

$$\lambda_f K_f>0 \tag{34}$$

Accordingly, if the output signals of the subtracters 95a and 95aa are positive step signals, the outputs of the filters 211 and 212 take negative values and the $\Delta\phi$-mode zero power control can be effected.

In each of the above embodiments, the number of magnetic support units is greater by one than a minimum necessary number of control modes for magnetically levitating the base. However, this does not limit the number of control modes for magnetically levitating the base, the number of magnetic support units, or the number of guide rails. The magnetic levitating apparatus according to the present invention can be modified variously, for example, as shown in FIG. 20 to FIG. 26 within the scope of the claims, depending on the use, the shape of the levitated object, the weight of the load, etc.

In FIG. 20, a levitated object 15c is constructed such that three pairs of magnetic support units 31a to 31f are attached to a base 25c so as to face three guide rails 12a, 12b and 12c, respectively. With this structure, the total weight of the levitated object are distributed to the guide rails, and the weight of the load on one guide rail is decreased. In FIG. 21, magnetic support units 31a to 31d are opposed to four ferromagnetic guides 312a to 312d, as shown in the figure, thereby constituting the levitated object 15d. This structure is advantageous for a vibration-proof base. Furthermore, in FIG. 22, eight magnetic support units 31a to 31h are attached to a base 25e, thereby constituting a levitated object 15e. With this structure, the total weight of the levitated object are distributed to the magnetic support units, and the weight of the load on one magnetic support unit is decreased.

Figure 23:
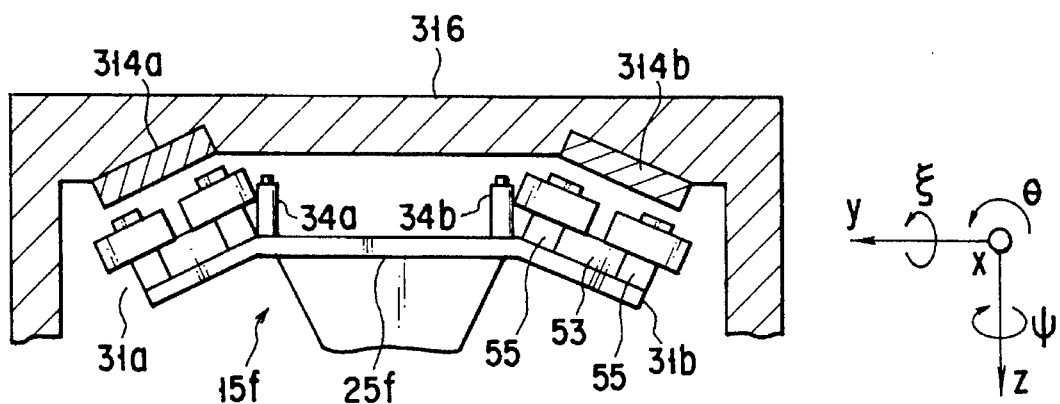
FIG. 23 is a vertical cross-sectional view showing a magnetic levitating apparatus according to still another embodiment of the invention.
Figure 24:
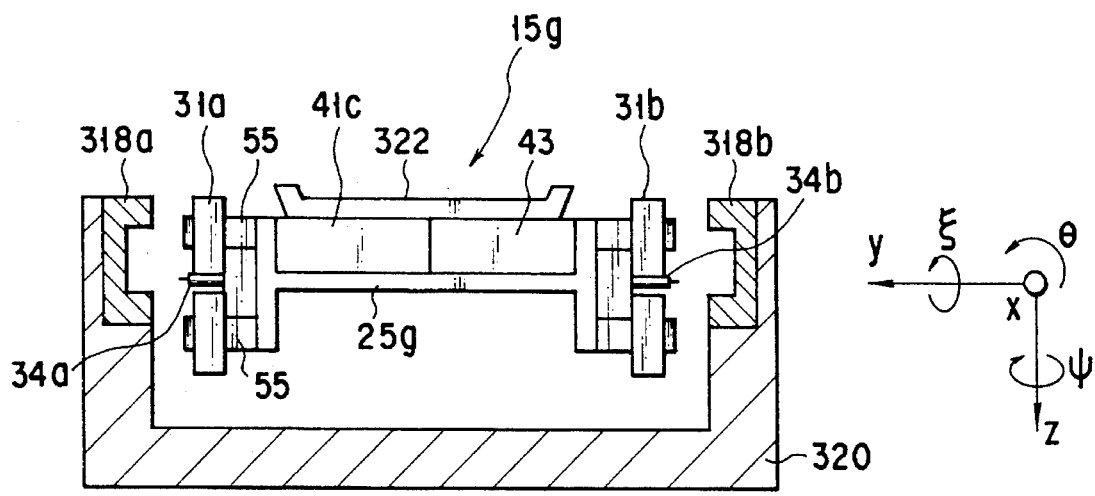
FIG. 24 is a vertical cross-sectional view showing a magnetic levitating apparatus according to still another embodiment of the invention.

In each of the above embodiments, the magnetic support units are attached horizontally to the base and situated to face the lower surfaces of the flat guide rails. However, in the present invention, the positional relationship and the cross-section of the guide rail are not limited to these. The guides or guide rails may be freely situated and may have any cross-sectional shapes, only if the magnetic support units produce attraction force on the guide rails and the zero power control can be effected by this attraction force. For example, various modifications may be made, as shown in FIGS. 23 to 26. In FIG. 23, flat guide rails 314a and 314b, each having a width substantially equal to the distance between outer portions of yokes 55 of each of magnetic support units 31a to 31d (units 31c and 31d are not shown), are obliquely attached to a track frame 31. In addition, the magnetic support units 31a to 31d are made to face the lower surfaces of the guide rails 314a and 314b, and gap sensors 34a to 34d (sensors 34c and 34d are not shown) are mounted on the upper surface of a base 25f so as to sense the levitation gap length in the support direction. Thus, a levitated object 15f is constituted. In this case, the attraction force acting between the magnetic support units 31a to 31d and the guide rails 314a and 314b is divided into a support force (z-direction) and a guide force (y-direction), and therefore a strong guide force can be obtained. In FIG. 24, guide rails 318a and 318b having U-cross sections are vertically attached to a track frame 320. Each of the guide rails 318a and 318b faces two yokes 55 of the corresponding one of magnetic support units 31a to 31d (units 31c and 31d are not shown). The magnetic support units 31a to 31d are mounted at four corners on side faces of a base 25g having an H-cross section so as to face the guide rails 318a and 318b. Furthermore, gap sensors 34a to 34d (sensors 34c and 34d are not shown) are attached to the magnetic support units 31a to 31d so as to be able to sense the gap length in the guide direction. Thereby, a levitated object 15g is constructed. A control device 41c, a power supply 43 and a load table 322 are arranged on the base 25g.

Figure 25:
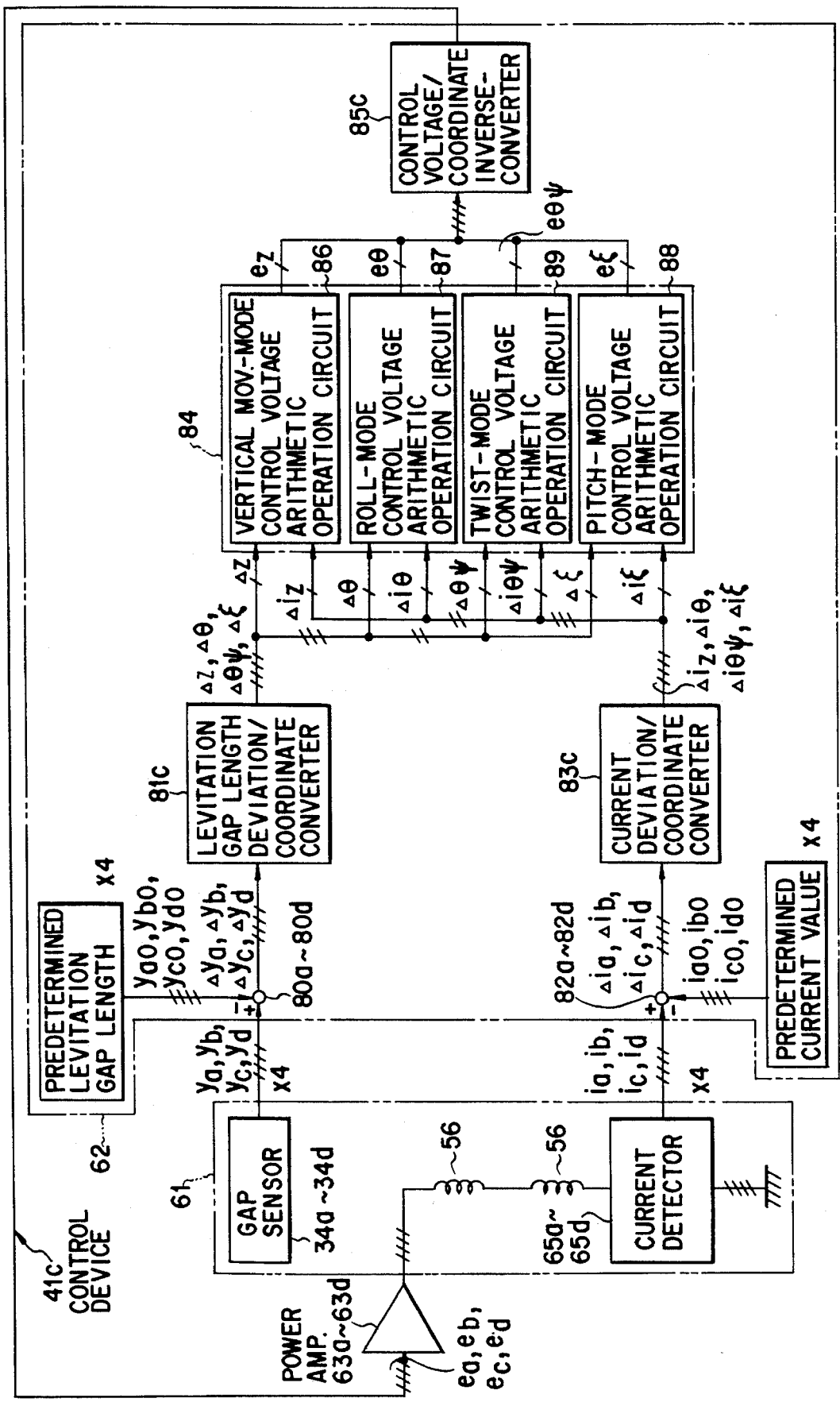
FIG. 25 is a block diagram showing the structure of a control apparatus in the magnetic levitating apparatus.

The control device 41c is constituted, as shown in FIG. 25. Specifically, the general structure of the control device 41 is similar to that of the control device 41, but the contents of arithmetic operations of the levitation gap length deviation/coordinate converter 81, current deviation/coordinate converter 83 and control voltage coordinate inverse-converter 85 are modified as expressed by formulae (35), (36) and (37):

$$\begin{cases} \Delta\theta = \frac{1}{4}(-\Delta y_a + \Delta y_b + \Delta y_c - \Delta y_d) \\ \Delta\theta_\psi = \frac{1}{2q_\xi}(-\Delta y_a + \Delta y_b + \Delta y_c + \Delta y_d) \\ \Delta z = \frac{1}{4}(\Delta y_a + \Delta y_b + \Delta y_c + \Delta y_d) \\ \Delta\xi = \frac{1}{2q_\xi}(-\Delta y_a - \Delta y_b + \Delta y_c + \Delta y_d) \end{cases} \quad (35)$$

$$\begin{cases} \Delta i_\theta = \frac{1}{4}(-\Delta y_a + \Delta i_b + \Delta i_c - \Delta i_d) \\ \Delta i_{\theta\psi} = \frac{1}{2q_\xi}(-\Delta i_a + \Delta i_b - \Delta i_c + \Delta i_d) \\ \Delta i_z = \frac{1}{4}(\Delta i_a + \Delta i_b + \Delta i_c + \Delta i_d) \\ \Delta i_\xi = \frac{1}{2q_\xi}(-\Delta i_a - \Delta i_b + \Delta i_c + \Delta i_d) \end{cases} \quad (36)$$

$$\begin{cases} e_a = -e_\theta - \frac{q_\xi}{2} e_{\theta\psi} + e_z - \frac{q_\xi}{2} e_\xi \\ e_b = e_\theta + \frac{q_\xi}{2} e_{\theta\psi} + e_z - \frac{q_\xi}{2} e_\xi \\ e_c = e_\theta - \frac{q_\xi}{2} e_{\theta\psi} + e_z + \frac{q_\xi}{2} e_\xi \\ e_d = -e_\theta + \frac{q_\xi}{2} e_{\theta p} + e_z + \frac{q_\xi}{2} e_\xi \end{cases} \quad (37)$$

In FIG. 5, the converters are denoted by numerals with character "c". The gains $K_{7\theta}$ and $K_{7\theta\phi}$ of the integral compensators 96 of the roll-mode control voltage arithmetic operation circuit 87 and twist-mode control voltage arithmetic operation circuit 89 are set at negative values. The gains $F_{1z}$'$F_{4z}$ of the vertical mov.-mode control voltage arithmetic operation circuit 86 and the gain $F_{1\xi}$ and $F_{4\xi}$ of the twist-mode control voltage arithmetic operation circuit 88 are set at zero since the levitated object 15g is not provided with a gap-variable mechanism. The gains $K_{7z}$ and $K_{7\xi}$ of the integral compensators 96 thereof are set at positive values. In this example, when the yokes 55 are displaced in the z-direction, the total weight of the levitated object 15g is supported by the upward attraction force acting on the guide rails 318a and 318b. Thus, most of the attraction force acting between the yokes 55 and guide rails 318a and 318b can be utilized as guide force.

In the example shown in FIG. 26, gap sensors 34a to 34d (sensors 34c and 34d are not shown) directed downwards are attached to the lower end portions at four corners of the base 25g, and a control device 41b is substituted for control device 41. When the levitated object 15h is moved downwards, the gap length of each magnetic support unit decreases. Thus, in the control device 41b, the signs of all gains of the gain compensators, to which z-mode, θ-mode and ξ-mode signals based on the gap sensors 34a to 34d are input, are inverted. In this example, a much stronger guide force than a levitation force can be obtained, and lateral movement and yawing of the levitated object 15h can be quickly reduced by the levitation/guide control.

Besides, in the above-described embodiment, the input to the zero power feedback loop is the linear coupling of gap length, variation speed thereof, or linear coupling of excitation current of coil 56. However, this does not limit the state amount to be input to the zero power feedback loop. For example, in the zero power control of the levitated object 15a shown in FIG. 9, the excitation voltages $e_z$, $e\xi$ and $e_w$ of the respective modes may be used as inputs to the zero power feedback loop. The zero power control system in which the excitation voltage of the coil 56 is input to the zero power feedback loop is described in detail in Japanese Patent Application No. 1-83710, and therefore a detailed description thereof is omitted.

Figure 28:
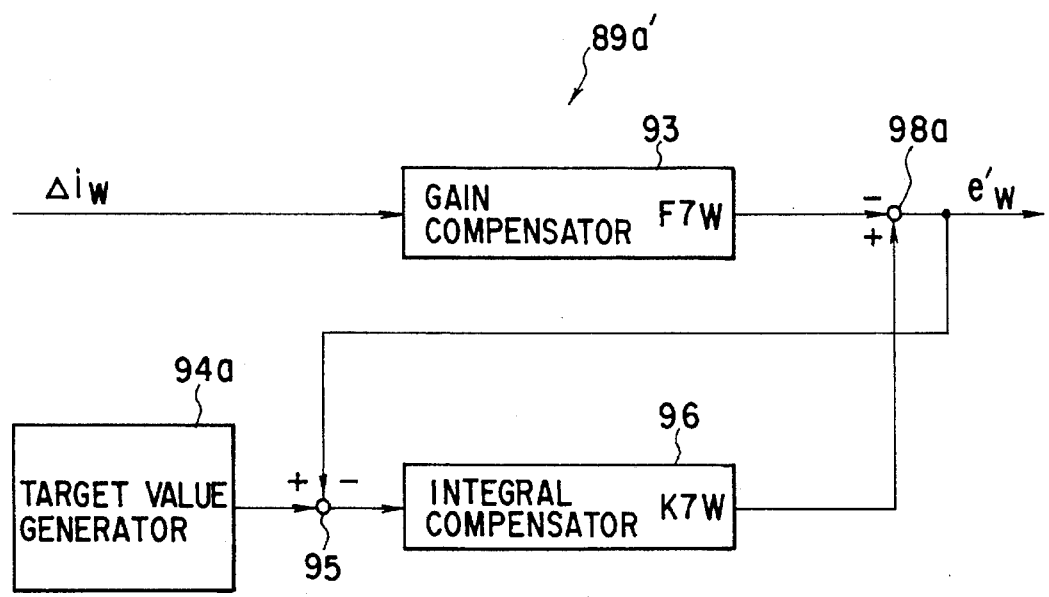
FIG. 28 is a block diagram showing the structure of a twist mode control voltage arithmetic operation circuit in the control voltage arithmetic operation circuit.

In this case, the vertical mov.-mode control voltage arithmetic operation circuit 86a, pitch-mode control voltage arithmetic operation circuit 88a and twist-mode control voltage arithmetic operation circuit 89a of the control voltage arithmetic operation circuit 84a are replaced by a vertical mov.-mode control voltage arithmetic operation circuit 86a' and a pitch-mode control voltage arithmetic operation circuit 88a', which comprise the identical elements as shown in FIG. 27, and a twist-mode control voltage arithmetic operation circuit 89a' as shown in FIG. 28.

Figure 29:
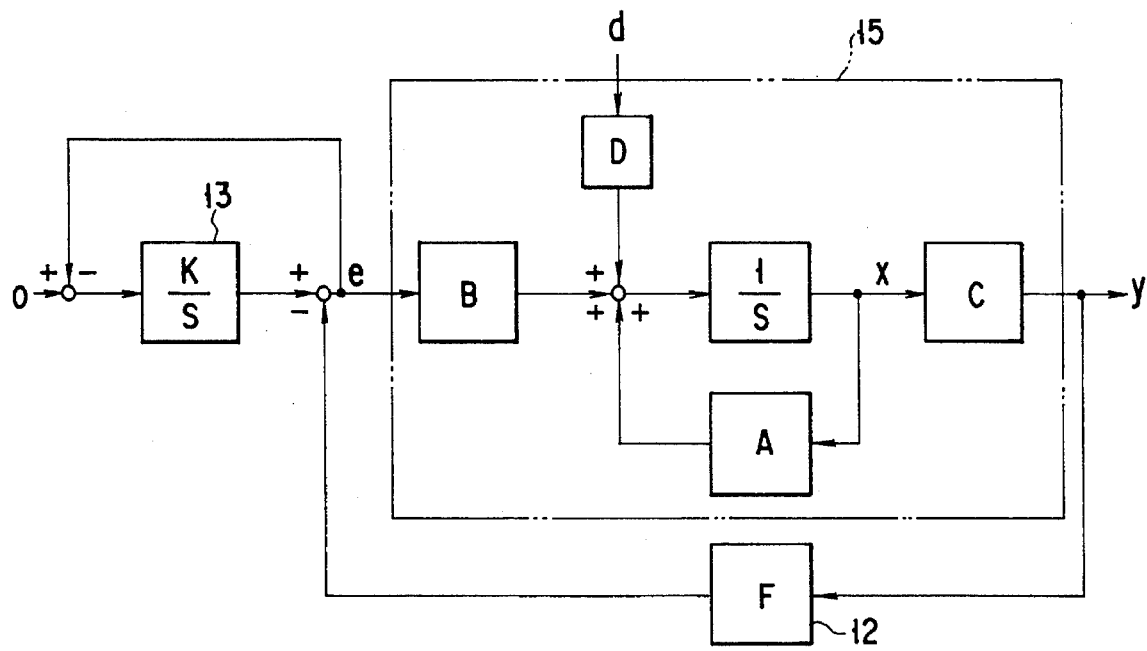

FIG. 29 is a block diagram of this magnetic levitation control system. The constant term of the characteristic formula of the system is $a_{41}a_{77}K_{7z}$'$a_{41}a_{77}K_{7\xi}$ in the z-mode and ξ-mode, and $-a_{77}K_{7w}$ in the w-mode. Since $a_{41}>0$ and $a_{77}<0$ from the characteristics of the magnetic levitation system, in order to stably levitate the levitated object 15a, it is necessary, as a matter of course, that the gains $K_{7z}$ and $K_{7H}K$ of the integral compensators 96' of the vertical mov.-mode control voltage arithmetic operation circuit 86a' and pitch-mode control voltage arithmetic operation circuit 88a' take negative values and the gain $K_{7w}$ of the integral compensator 96a' of the twist-mode control voltage arithmetic operation circuit 89a' take a positive value.

Furthermore, in each of the above examples, the control device and the operation thereof have been described from an aspect of analog control. However, the control system is not limited to this, and digital control system can be adopted. Various modifications can be made without departing from the spirit of the present invention.

As been described above, according to the magnetic levitating apparatus of the present invention, the magnetic support units and the levitated object are not moved independently. Therefore, when the levitated object is removed from the track end by holding a part of the levitated object, the magnetic support unit does not collide with or is not attracted to the guide rails due to the attraction force acting on the guide rails. In addition, the handling of the levitated object itself is easy and the maintainability of the apparatus can be enhanced remarkably.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic levitating apparatus comprising:

a guide rail having at least a portion thereof formed of a magnetic material;

a levitated object supported by the guide rail in a non-contact state;

magnetic support units for magnetically levitating the levitated object, each of said magnetic support units having an electromagnet and a permanent magnet, said electromagnet and said permanent magnet constituting a magnetic circuit with said guide rail;

gap-variable mechanisms for varying gap lengths between the magnetic support units and the guide rail independently;

a first zero power control loop system for reducing to zero a result of a mathematical function selected from the group consisting of addition and subtraction of excitation currents to the electromagnets of at least two of the magnetic support units which define at least two degrees of freedom of movement of the levitated object, said first zero power control loop system having at least a control mode defined on the basis of a degree of freedom of movement of a levitated object, for controlling an output value to have the same polarity as an input value;

a second zero power control loop system for reducing to zero an excitation current to the electromagnet of at least one of the magnetic support units on the basis of the results of a mathematical function obtained by said first zero power control loop system on the basis of a result of a mathematical function selected from the group consisting of an addition and subtraction of excitation currents to the electromagnets of at least two of the magnetic support units which make no contribution to at least two degrees of freedom of movement of the levitated object, said second zero power control loop system having at least said control mode for controlling an output value to have the opposite polarity as an input value; and a specific control means for controlling an excitation current to the electromagnet of at least one of the magnetic support units so as to achieve the operation of said first and second zero power control loop systems on the basis of the output of a sensor unit.

2. The apparatus according to claim 1, wherein said two degrees of freedom of movement in said control means are defined by a vertical movement of the center of gravity of the levitated object and a pitch movement around the center of gravity of the levitated object.

3. The apparatus according to claim 1, wherein said first zero power control loop system includes means for reducing to zero a result of a mathematical function selected from the group consisting of addition and subtraction of excitation currents to the electromagnets of at least two of the magnetic support units which make contributions to a levitation control in a roll-direction of the levitated object.

4. The apparatus according to claim 3, wherein said second zero power control loop system includes means for suppressing yawing of the levitated object on the basis of a result of a mathematical function selected from the group consisting of addition and subtraction of excitation currents to the electromagnets of at least two of the magnetic support units.

5. The apparatus according to claim 1, wherein said two degrees of freedom of movement are defined by a lateral movement of the center of gravity of the levitated object.

6. The apparatus according to claim 1, wherein said gap-variable mechanism includes an elastic member, said elastic member has a predetermined spring force, said predetermined spring force being set such that an inverse number of a variation amount, per unit weight, of a respective gap, when the supported surface is fixed and a load is applied to a respective the magnetic unit, is greater than an absolute value of a value obtained by differentiating the attraction in the direction of gap variation of a specific one of the magnet units by the gap length at the time when the excitation current to the electromagnet is zero and a maximum load is placed on the levitated object.

7. The apparatus according to claim 1, wherein said gap-variable mechanism is a body of said levitated object for commonly supporting said plurality of magnetic support units.

8. The apparatus according to claim 1, wherein at least one of said first and second zero power control loop systems includes an integral compensator for receiving a result of a mathematical function selected from the group consisting of addition and subtraction of excitation currents to the electromagnets of at least two of the magnetic support units and integrating the result of said mathematical function with a predetermined gain.

9. The apparatus according to claim 1, wherein at least one of said first and second zero power control loop systems includes:

a state observer for observing a value of a result of a mathematical function selected from the group consisting of addition and subtraction of an external force acting on a specific unit on the basis of an output value of the sensor unit; and a gain compensator for receiving an estimated value of the state observer and multiplying the input estimated value by a predetermined gain.

10. The apparatus according to claim 1, wherein at least one of said first and second zero power control loop systems includes a filter, having a first-order transmission function, for receiving a result of a mathematical function selected from the group consisting of addition and subtraction of gap lengths between specific magnetic support units and the guide rail, a time variation factor of said mathematical function result, and a calculation result of excitation currents to electromagnets of the specific magnetic support units, and multiplying the received inputs by predetermined gains which are not zero at the same time.

11. The apparatus according to claim 1, wherein said sensor unit obtains at least one of a gap length between the electromagnet and the guide rail, a variation velocity of the gap length, and an excitation current to the electromagnet.

12. The apparatus according to claim 1, wherein at least one of said first and second zero power control loop systems includes an integral compensator for receiving an a result of a mathematical function selected from the group consisting of addition and subtraction of excitation currents to electromagnets of specific magnetic support units and integrating the input mathematical function result with a predetermined gain.

13. A magnetic levitating apparatus comprising:

a guide rail having at least a portion thereof formed of a magnetic material;

a levitated object supported by the guide rail in a non-contact state;

magnetic support units for magnetically levitating the levitated object, each of said magnetic support units having an electromagnet and a permanent magnet, said electromagnet and said permanent magnet constituting a magnetic circuit with said guide rail;

a sensor unit for sensing the state of the magnetic circuit of each of the magnetic support units;

a first zero power control loop system for reducing to zero a result of a mathematical function selected from the group consisting of addition and subtraction of excitation currents to the electromagnets of at least two of the magnetic support units which define at least two degrees of freedom of movement of the levitated object, said first zero power control loop system having at least a control mode defined on the basis of a degree of freedom of movement of a levitated object, for controlling an output value to have the same polarity as an input value;

a second zero power control loop system for reducing to zero an excitation current to the electromagnet of at least one of the magnetic support units on the basis of the result of a mathematical function obtained by said first zero power control loop system and on the basis of a result of a mathematical function selected from the group consisting of addition and subtraction of excitation currents to the electromagnets of at least two of the magnetic support units which make no contribution to at least two degrees of freedom of movement of the levitated object, said second zero power control loop system having at least said control mode for controlling an output value to have the opposite polarity as an input value; and specific control means for controlling an excitation current to the electromagnet of at least one of the magnetic support units so as to achieve the operation of said first and second zero power control loop systems on the basis of the output of the sensor unit.

14. The apparatus according to claim 13, further comprising:

a plurality of gap-variable mechanisms for varying gap lengths between the magnetic support units and the guide rail, each of the gap-variable mechanisms having an elastic member situated between an associated one of the magnetic support units and the levitated object.

15. The apparatus according to claim 14, wherein said elastic member of the gap-variable mechanism has a predetermined spring force, said predetermined spring force being set such that an inverse number of a variation amount, per unit weight, of a respective gap, when the supported surface is fixed and a load is applied to a respective magnetic unit, is greater than an absolute value of a value obtained by differentiating the attraction in the direction of gap variation of a specific one of the magnet units by the gap length at the time when the excitation current to a respective electromagnet is zero and a maximum load is placed on the levitated object.

16. The apparatus according to claim 14, wherein said gap-variable mechanism is a body of said levitated object for commonly supporting said plurality of magnetic support units.

17. The apparatus according to claim 13, wherein said two degrees of freedom of movement in said control means are defined by a vertical movement and a pitch movement of the center of gravity of the levitated object.

18. The apparatus according to claim 13, wherein said first zero power control loop system includes means for reducing to zero a result of a mathematical function selected from the group consisting of addition and subtraction of excitation currents to the electromagnets of at least two of the magnetic support units which make contributions to a levitation control in a roll-direction of the levitated object.

19. The apparatus according to claim 18, wherein said second zero power control loop system includes means for suppressing yawing of the levitated object on the basis of said mathematical function result of excitation currents to the electromagnets of at least two of the magnetic support units.

20. The apparatus according to claim 13, wherein said two degrees of freedom of movement are defined by a lateral movement of the center of gravity of the levitated object.

21. The apparatus according to claim 13, wherein at least one of said first and second zero power control loop systems includes an integral compensator for receiving a result of a mathematical function selected from the group consisting of addition and subtraction of excitation currents to the electromagnets of at least two of the magnetic support units and integrating the input mathematical function result with a predetermined gain.

22. The apparatus according to claim 13, wherein at least one of said first and second zero power control loop systems includes:

a state observer for observing a value of a result of a mathematical function selected from the group consisting of addition and subtraction of external forces acting on specific magnetic support units on the basis of an output value of the sensor unit; and a gain compensator for receiving an estimated value of the state observer and multiplying the input estimated value by a predetermined gain.

23. The apparatus according to claim 13, wherein at least one of said first and second zero power control loop systems includes a filter, having a first-order transmission function, for receiving a result of a mathematical function selected from the group consisting of addition and subtraction of a gap lengths between specific magnetic support units and the guide rail, a time variation factor of said mathematical function result, and for receiving a result of a mathematical function selected from the group consisting of addition and subtraction of an excitation currents to the electromagnet of the specific magnetic support units, and multiplying the received inputs by predetermined gains which are not zero at the same time.

24. The apparatus according to claim 13, wherein said sensor unit obtains at least one of a gap length between the electromagnet and the guide rail, a variation velocity of the gap length, and an excitation current to the electromagnet.

25. The apparatus according to claim 13, wherein at least one of said first and second zero power control loop systems includes an integral compensator for receiving a result of a mathematical function selected from the group consisting of addition and subtraction of excitation currents to electromagnets of specific magnetic support units and integrating the mathematical function result with a predetermined gain.

* * * * *